United States Patent
Kami et al.

(10) Patent No.: US 6,805,827 B2
(45) Date of Patent: Oct. 19, 2004

(54) MOLD CLAMPING DEVICE, METHOD OF INCREASING/DECREASING PRESSURE FOR SUCH DEVICE, AND MOLD RELEASING METHOD

(75) Inventors: Masahiro Kami, Ube (JP); Hidenobu Ono, Ube (JP); Masayuki Tsuruda, Ube (JP); Kazuo Kubozoe, Ube (JP); Iseo Kamota, Ube (JP); Tokuhisa Okada, Ube (JP); Hiroyuki Takatori, Ube (JP)

(73) Assignee: Ube Machinery Corporation, Ltd. (JP)

( * ) Notice: Subject to any disclaimer, the term of this patent is extended or adjusted under 35 U.S.C. 154(b) by 214 days.

(21) Appl. No.: 10/168,943
(22) PCT Filed: Dec. 28, 2000
(86) PCT No.: PCT/JP00/09442

§ 371 (c)(1),
(2), (4) Date: Jun. 25, 2002

(87) PCT Pub. No.: WO01/47686

PCT Pub. Date: Jul. 5, 2001

(65) Prior Publication Data

US 2003/0003178 A1 Jan. 2, 2003

(30) Foreign Application Priority Data

| Dec. 28, 1999 | (JP) | ............................................ 11-372283 |
| Feb. 10, 2000 | (JP) | ...................................... 2000-038209 |
| Feb. 21, 2000 | (JP) | ...................................... 2000-043622 |
| Feb. 21, 2000 | (JP) | ...................................... 2000-043623 |
| Feb. 21, 2000 | (JP) | ...................................... 2000-043624 |
| Feb. 21, 2000 | (JP) | ...................................... 2000-043625 |
| Feb. 21, 2000 | (JP) | ...................................... 2000-043626 |

(51) Int. Cl.$^7$ ............................ B29C 45/67; B29C 45/82
(52) U.S. Cl. ..................... 264/328.1; 425/169; 425/190; 425/214; 425/451.7; 425/589; 425/595
(58) Field of Search ...................... 264/328.1; 425/169, 425/190, 214, 451.7, 589, 595

(56) References Cited

U.S. PATENT DOCUMENTS 6,206,676 B1 * 3/2001 McNally ...................... 425/214

FOREIGN PATENT DOCUMENTS

| JP | 44-16008 | | 7/1969 |
| JP | 62-28726 | * | 6/1987 |
| JP | 63-64716 | * | 3/1988 |
| JP | 6-246806 | * | 9/1994 |
| JP | 6-262332 | * | 9/1994 |
| JP | 9-109206 | * | 4/1997 |
| JP | 10-94864 | * | 4/1998 |
| JP | 11-235741 A | | 8/1999 |

* cited by examiner

Primary Examiner—James P. Mackey
(74) Attorney, Agent, or Firm—Piper Rudnick LLP

(57) ABSTRACT

A stationary platen (14) and a movable platen (18), which are connected with each other by tie rods (28), to which metallic molds are respectively attached, are opened and closed by an electrically driven ball screw mechanism. The movable platen is composed of a platen body and a pressure plate (304) attached to the platen body which can be contacted with and separated from the platen body. Between the movable platen and the pressure plate, clamping is conducted by the expansion and contraction of a bladder (318) into which hydraulic oil for clamping can be introduced. The bladder houses an insert die (320), the shape of which is identical with an internal shape of the bladder, and a hydraulic oil path is formed in the insert die. While a ball screw member (102) of an electrically driven ball screw mechanism is being supported being capable of moving in the axial direction, a brake means (130) for restricting rotation is provided, and a mold releasing cylinder mechanism (116) is connected. The mold releasing cylinder mechanism is operated when it shares a hydraulic pressure supply source for supplying hydraulic pressure to the bladder and the hydraulic oil path is changed over.

23 Claims, 30 Drawing Sheets

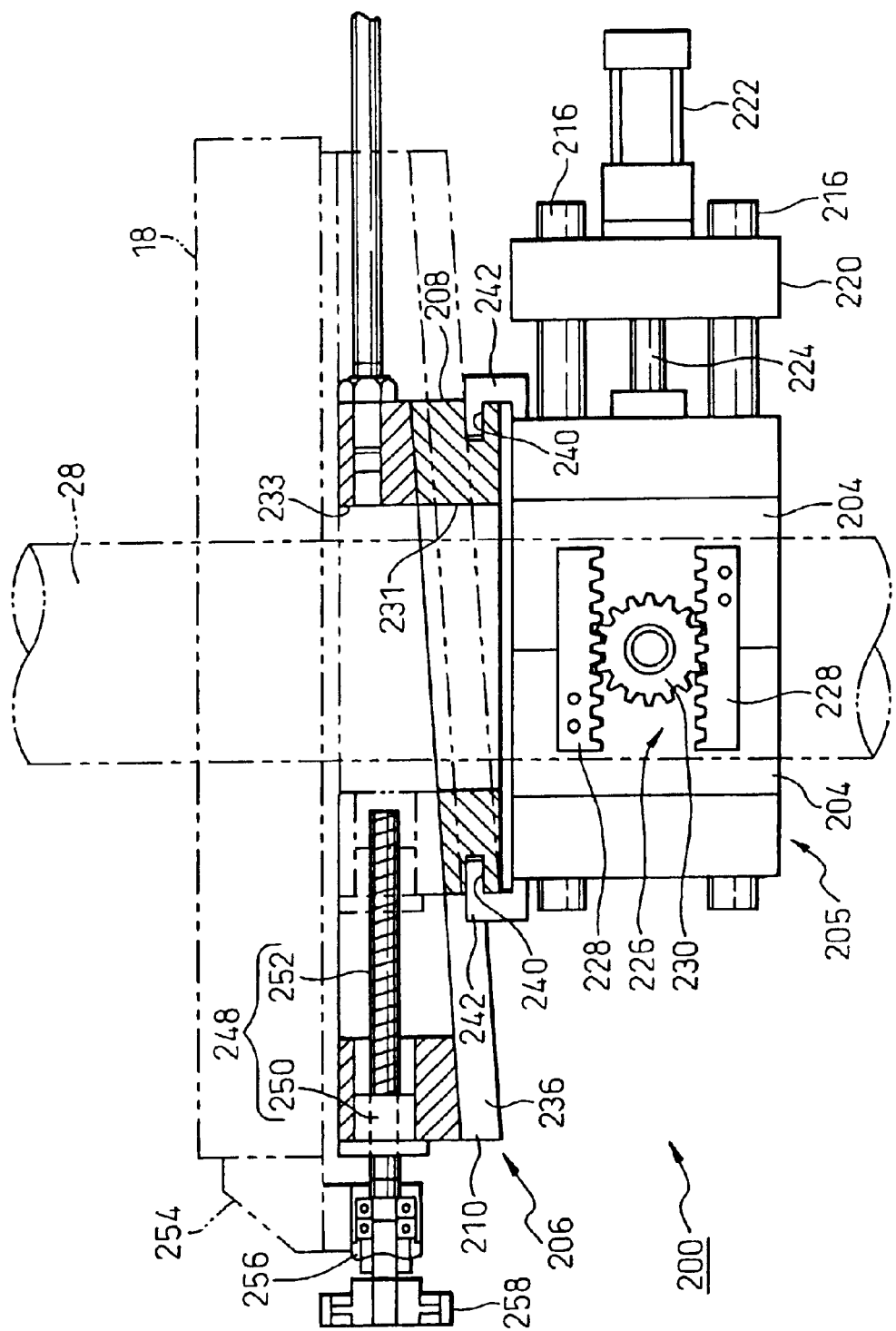

VIEWED FROM ARROW B

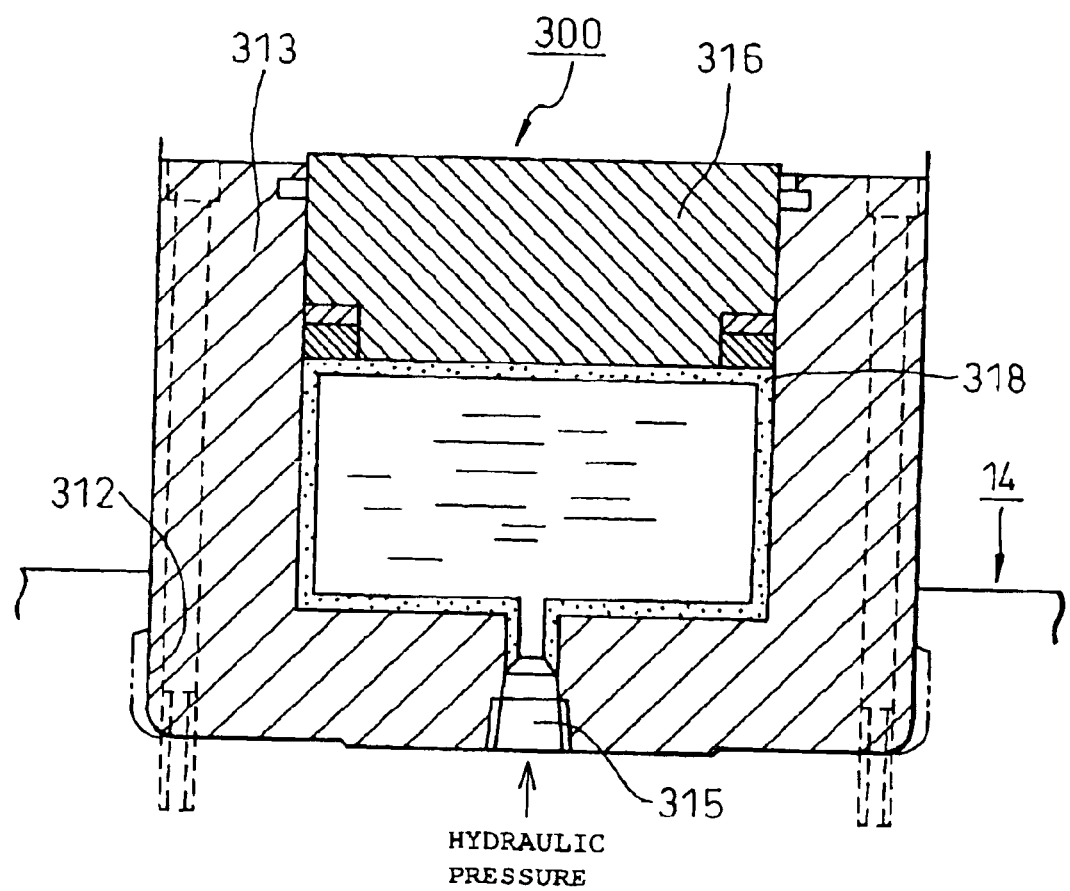

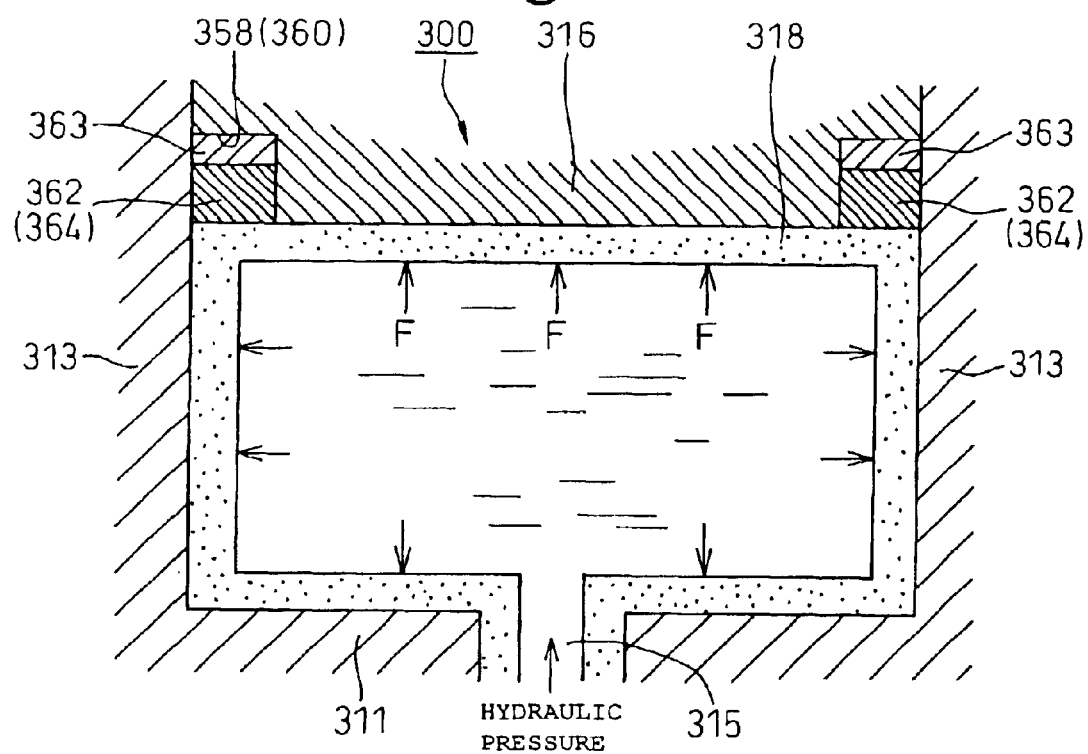

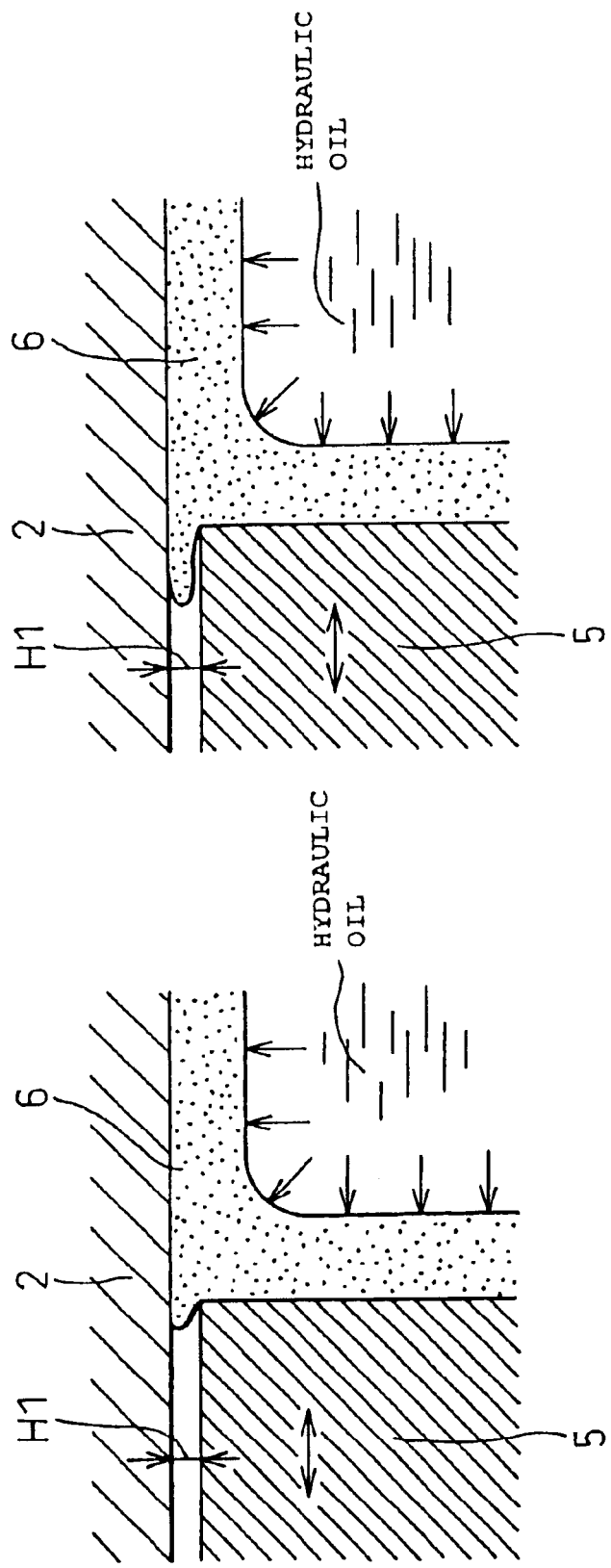

MOLD CLAMPING DEVICE, METHOD OF INCREASING/DECREASING PRESSURE FOR SUCH DEVICE, AND MOLD RELEASING METHOD

TECHNICAL FIELD OF THE INVENTION

The present invention relates to a clamping device. More particularly, the present invention relates to a hybrid type clamping device in which a hydraulic drive system used for a large clamping device and an electric drive system used for a small clamping device are combined with each other. Further, the present invention relates to a method of increasing and decreasing hydraulic pressure used in this clamping device. Furthermore, the present invention relates to a method of releasing a mold.

BACKGROUND ART OF THE INVENTION

Conventionally, main stream clamping devices used for injection molding machines or die casting machines are hydraulic drive systems such as direct pressure type clamping devices or toggle type clamping devices. Recently, in order to meet the demand of saving energy and making the working environment clean, an electric drive type clamping device, in which a mold can be opened and closed when a rotary motion of a servo motor is converted into a linear motion of the mold by a ball screw nut, has been widely used, especially in the field of small molding machines.

However, although this small clamping device in which the electric drive system is used can meet the demand of saving energy and making the working environment clean, when the size of this small clamping device is proportionally increased so that the electric drive system can be applied to a large clamping device, the size of the clamping device cannot be increased very much because an increase in the size of a servo motor, and of a ball screw, are restricted. In order to solve the above problems, a hybrid type clamping device, in which an electric drive system is used for a mold opening and closing means and a hydraulic system is used for a clamping force generating means, has been devised.

For example, Japanese Unexamined Patent Publication No. 6-246806 discloses an example of the hybrid type clamping device in which a metallic mold is opened and closed when a movable platen is moved by a screwing motion of a male screw conducted by an AC servo motor, and a clamping motion conducted after the mold has been closed is conducted by a hydraulic means. This hydraulic clamping device is composed as follows. At the back of the movable platen, a hydraulic operating board is arranged which includes a closed chamber having a tightly closed bladder into which hydraulic fluid is charged. After the hydraulic operating board has been locked together with a movable platen, the male screw member is further moved by an electric motor. Due to the foregoing, the tightly closed bladder is pressurized, so that a clamping force is given to a metallic mold by a piston and via the movable platen. In the case of opening the metallic mold, the male screw member is reversed so that the movable platen can be drawn in.

In the conventional hybrid type clamping device described above, while the tightly closed bladder is being pressurized by the male screw in the closed chamber, the pressurizing action is maintained when the male screw member is screwed by an AC servo motor by a ball screw mechanism. Further, both the mold releasing and the mold opening are conducted when the male screw member is screwed in the same manner. Therefore, in the working time when the mold is opened and closed and when the clamping force is given to the mold and when the mold is released, a load must be always given to the electric motor which is a drive source. Therefore, it is impossible to sufficiently accomplish energy saving. Further, since both the electric drive system and the hydraulic drive system are jointly used, the structure of the clamping device becomes complicated, and the frequency of mechanical breakdown is increased.

The above conventional hybrid type clamping device is composed in such a manner that the tightly closed bladder is pressurized by the male screw in the closed chamber. Therefore, unless air is completely removed from the tightly closed bladder when the tightly closed bladder is charged with hydraulic fluid, the clamping force cannot be appropriately given to the mold. It is very difficult to form the tightly closed bladder into which hydraulic fluid is charged in accordance with a volume of the stationary closed chamber. Further, as the tightly closed bladder is deformed into a recessed shape, there is a possibility that the bladder is damaged and the hydraulic fluid leaks out from the bladder. Therefore, it is impossible to increase the clamping force.

Further, the clamping device used for a conventional injection molding machine or die casting machine is composed in such a manner that a stationary platen and a movable platen, to which metallic molds are respectively attached, which are connected with each other by tie rods, are fixed to each other at a mold closing position by a platen lock means. Usually, the platen lock means is composed of a pair of split nuts capable of being opened and closed. When the pair of split nuts are engaged with ring grooves or screw grooves, the movable platen can be fixed and held at the mold clamping position.

In this connection, when a metallic mold is changed, the thickness (die-height) of the metallic mold is changed. Therefore, the mold closing position is naturally changed, and the lock position of the movable platen is also changed. When the die-height is changed as described above, the pitch of engagement of a split nut with a tie rod is shifted in some cases. Accordingly, there is usually provided a die-height adjusting mechanism.

As a conventionally well known die-height adjusting mechanism, as disclosed in Japanese Examined Patent Publication No. 44-16008, there is provided a mechanism in which tie rods are arranged so that they can be moved in the axial direction with respect to a stationary platen so that a phase shift caused between a split nut and the tie rod can be adjusted. Further, as disclosed in Japanese Unexamined Patent Publication No. 11-235741, there is provided a mechanism in which a clamping cylinder is fixed onto a mount moving when a mold is opened and closed, and a movable platen capable of moving on this mount is connected to the clamping cylinder, and when a phase shift is caused between a split nut and a tie rod at a mold closing position, a distance between the clamping cylinder and the movable platen is adjusted so that the die-height can be adjusted.

However, the former mechanism is disadvantageous in that the tie rod must be made movable with respect to the stationary platen, so that the size of the device is increased and the clamping accuracy is deteriorated. The latter mechanism is disadvantageous in that a large-scale device is required for adjusting the die-height. Further, it is necessary to compose the device in such a manner that while the clamping cylinder is being moved together with the movable platen, the distance between them must be made variable.

In the case of a booster-ram type clamping device, the mold opening is conducted in a front hydraulic chamber of the clamping cylinder. Therefore, the accuracy of the entire inner face of the clamping cylinder must be high, and further the diameter is extended. Accordingly, it is hard to conduct precision machining, which results in increasing the manufacturing cost. In the case where the clamping cylinder, the diameter of which is large, is used for opening the mold as described above, the total length of a die casting machine or an injection molding machine is extended, and it becomes difficult to install the die casting machine or the injection molding machine in a small space.

In order to solve the above problems, Japanese Unexamined Patent Publication No. 10-94864 discloses the following arrangement. As shown in FIGS. 31 and 32, the metallic mold attaching plate 3 is put and held on the stationary platen 2, at a plurality of corners of which the tie rods 1 are provided, and the cylinder holes 4 open to the metallic mold attaching plate 3 side are formed on the stationary platen 2. Further, there are provided rams 5 which are slidably engaged with the cylinder holes 4. Furthermore, the tightly closed bladder 6 (shown in FIG. 32), to which hydraulic pressure is applied, is provided in each cylinder hole 4. When hydraulic pressure in the tightly closed bladder 6 is increased, a pushing force is given via the ram 5 so that the metallic mold attaching plate 3 can be pushed to the stationary metallic mold 7 side.

However, when the aforementioned tightly closed bladder 6 is used, the following problems may be encountered. In the case where hydraulic oil is supplied into the tightly closed bladder 6 so as to expand the tightly closed bladder 6 and push the ram 5, or in the case where hydraulic oil is discharged from the tightly closed bladder 6 so as to retract the ram 5 and contract the tightly closed bladder 6, when the tightly closed bladder 6 is repeatedly expanded and contracted, as shown in FIGS. 33A and 33B, a portion of the tightly closed bladder 6 is pushed into clearance H1 between the stationary platen 2 and the ram 5. When the device is used in this state over a long period of time, the tightly closed bladder 6 is finally damaged.

DISCLOSURE OF THE INVENTION

In view of the above conventional problems, the present invention has been accomplished. It is an object of the present invention to provide a compact clamping device and a method of releasing a mold characterized in that: while energy saving is sufficiently accomplished, a high clamping force is generated; and while a hydraulic source is used in common between the clamping pressure mechanism and the mold releasing mechanism, a mold releasing motion can be conducted separately from the clamping mechanism.

Further, another object of the present invention is described as follows. A mold releasing force is given by an electrically driven ball screw mechanism for opening and closing a mold and, while the energy consumption of the electrically driven ball screw mechanism is reduced, the electric driving and the hydraulic driving are preferably combined with other so as to save energy in the processes of clamping and releasing the mold. It is another object of the present invention to accomplish saving in the entire energy consumption.

It is still another object of the present invention to provide a pressurizing mechanism in which hydraulic oil is charged and pressure is generated by the expansion and contraction of hydraulic oil, and this pressurizing mechanism has a structure by which air can be completely removed from the mechanism. It is still another object of the present invention to provide a clamping device in which the above pressurizing mechanism is utilized. In addition to that, it is still another object of the present invention to provide a compact clamping device in which the pressurizing mechanism is utilized while energy can be sufficiently saved and a high intensity clamping force can be generated.

It is still another object of the present invention to provide a pressurizing mechanism of a clamping device characterized in that: the total length of a die casting machine or an injection molding machine can be reduced to as small as possible; the installing space is reduced; the clamping motion can be quickly conducted; and the durability of the mechanism is high.

It is still another object of the present invention to provide a clamping device characterized in that: the structure is very simple; and the die-height can be appropriately adjusted.

It is still another object of the present invention to provide a method of increasing and decreasing hydraulic pressure for clamping capable of realizing energy saving and generating a high intensity clamping force. It is still another object of the present invention to realize saving energy in the clamping process by reducing energy consumption of a drive source after hydraulic pressure has been increased to a value necessary for a clamping force and also by maintaining a pump motor in a state of no load so that energy saving can be accomplished in entire energy consumption. It is still another object of the present invention to prevent the occurrence of vibration and abnormal sound caused when pressure is suddenly reduced in the case of decreasing a clamping force.

It is still another object of the present invention to provide a clamping device characterized in that: hydraulic energy can be transmitted to the clamping device from a hydraulic pressure generating mechanism arranged outside via a hydraulic circuit while hydraulic pressure generating mechanism is not being incorporated into the clamping device; the structure is simple; and the property of saving energy is high and the accuracy of control is excellent.

In order to accomplish the above objects, in an embodiment of a clamping device of the present invention, a pressurizing mechanism comprises: a movable platen having a movable metallic mold, arranged to be capable of going forward and back; a stationary platen having a stationary metallic mold, arranged opposite to the movable platen; a pressure plate arranged between the stationary platen and the stationary metallic mold, the stationary metallic mold being attached to the pressure plate; a piston slidably engaged in a cylinder arranged in the stationary platen, the piston being capable of protruding toward the pressure plate; a bladder arranged between the piston and the cylinder of the stationary platen, the bladder being expanded and contracted when pressure is supplied and discharged, so that clamping can be conducted between the movable and the stationary metallic die via the piston; and a soft protective member interposed between the piston and the bladder, capable of filling a gap formed between them when the bladder is expanded. When the piston is protruded by the expansion of the bladder, a pressure force for clamping is given between the movable metallic mold and the stationary metallic mold via the pressure plate. Further, intrusion of the bladder into the gap is prevented by the sealing action of the soft protective member so that the bladder can be prevented from being damaged.

Another embodiment of a clamping device of the present invention is composed as follows. A stationary platen and movable platen, which are connected to each other by tie rods, to which metallic molds are attached, can be opened and closed by an electrically driven ball screw mechanism. One of the above platens is composed of a platen body and a pressure plate attached to the platen body, the pressure plate being capable of coming into contact with and separating from the platen body, at least in a range of a clamping stroke. The clamping device includes a pressurizing mechanism for clamping between the platen body and the pressure plate. The pressurizing mechanism is composed in such a manner that when a bladder, into which hydraulic oil can be introduced, and arranged in a cylinder, is expanded and contracted, a piston can be pushed out. An insert die, the shape of which is identical with that of the internal shape of the bladder, is housed in the bladder. A hydraulic path is formed in the insert die. A ball screw member of the electrically driven ball screw mechanism is supported while being capable of moving in the axial direction. A brake means for braking rotation is provided in the ball screw member. A mold releasing cylinder mechanism for generating a mold releasing force in the axial direction is connected to it. A hydraulic pressure supply source is commonly used between this mold releasing cylinder mechanism and the aforementioned bladder. When a hydraulic oil path is changed over, the mold releasing cylinder mechanism can be operated.

In this structure, the mold releasing cylinder mechanism is composed in such a manner that hydraulic oil in the clamping hydraulic circuit can be supplied to the mold releasing cylinder mechanism. It is preferable to adopt the following structure. In the hydraulic path to the mold releasing cylinder mechanism, there is provided a hydraulic pressure containing means for containing hydraulic pressure at a position of the origin of the ball screw member so that a movement in the axial direction can be restricted.

In the above structure, the pressurizing means includes a cylinder section and a piston which is housed in the cylinder section and capable of reciprocating in the cylinder section. The cylinder section accommodates a bladder which is expanded and contracted when hydraulic oil is supplied to and discharged from it so that the piston can be pushed out. This bladder houses an insert die, the shape of which is identical with that of the internal structure of the bladder. An opening edge section of the bladder is contacted with pressure and fixed to between the insert die and the cylinder section. Hydraulic oil can be supplied to the bladder from the hydraulic path formed in the insert die. In this case, when a protrusion is formed in the bladder and an engaging groove to be engaged with the protrusion is formed in the insert die, the bladder can be fixed to the insert die so that the insert die cannot be drawn out. A notch step section is formed in the peripheral edge of the piston at which the piston is opposed to the bladder, and a soft protective member is arranged in this notch step section so that it can be opposed to the pushing peripheral edge of the bladder. It is preferable that an oil leakage detecting means is arranged on a sliding face of the piston in the cylinder section so as to detect the occurrence of damage of the bladder.

In another embodiment of a clamping device of the present invention, in a clamping device in which a stationary platen and a movable platen, which are connected with each other by tie rods, to which metallic molds are attached, can be fixed at a mold closing position by a platen lock means, a wall thickness changing plate means is provided between the platen lock means and the platen. A clamping device in which a stationary platen and movable platen, which are connected with each other by tie rods, to which metallic molds are attached, can be fixed to each other at a mold closing position by a platen lock means, comprises a wedge mechanism for adjusting a position of the platen lock means in the axial direction of the tie rod by the wedge action. The wedge mechanism is composed of a stationary wedge and movable wedge which are interposed between the platen lock means and the platen and come into contact with each other on an oblique face. In this arrangement, the wedge thickness may be changed by providing an insertion depth adjusting mechanism for adjusting an insertion depth of the movable wedge.

Further, the present invention provides a method of controlling an increase and decrease in clamping hydraulic pressure which will be described as follows. After a mold has been closed by a stationary platen and movable platen, which are connected with each other by tie rods, to which metallic molds are attached, hydraulic pressure is introduced into a pressurizing mechanism capable of pushing out a pressure plate attached to a platen body, the pressure plate being capable of coming into contact with and separating from the platen body, so that a clamping force is generated. In the case of increasing hydraulic pressure, a rotating speed of a piston pump is controlled so as to supply hydraulic oil to the pressurizing mechanism. After hydraulic pressure has increased to a clamping pressure, the hydraulic pressure is contained on the pressurizing mechanism side. After that, when a reverse speed of the piston pump is controlled, hydraulic pressure in a hydraulic oil path on the upstream side of the pressure containing position is gradually decreased. After the hydraulic pressure has been sufficiently decreased, the piston pump is stopped. In the case of decreasing hydraulic pressure, when a rotating speed of the piston pump is controlled, hydraulic oil is supplied to the pressurizing mechanism. Due to the foregoing, after the hydraulic pressure has increased to clamping pressure, hydraulic pressure in a hydraulic oil path on the upstream side of the containing position is increased from a state in which hydraulic pressure is contained on the pressurizing mechanism side until the pressures before and after the containing position become equal by operating the piston pump. After the containing state has been released, the reversing speed of the piston pump is controlled, so that hydraulic pressure in the hydraulic oil path on the upstream side of the containing position is gradually decreased and opened onto the tank side. In this way, a clamping force is controlled by increasing and decreasing pressure.

A method of releasing a mold of the present invention will be described as follows. A stationary platen and movable platen, which are connected with each other by tie rods, to which metallic molds are attached, open and close the metallic molds by an electrically driven ball screw mechanism. With respect to at least one of the platens, when hydraulic pressure is introduced into a bladder capable of being expanded and contracted or hydraulic pressure is introduced into a cylinder mechanism which moves forward and back by hydraulic pressure, a piston is pushed and clamping is conducted. While a screw member of the electrically driven ball screw mechanism is being supported by the platen being capable of moving in the axial direction, the screw member is restricted so that it cannot be rotated, and the ball screw member is moved in the axial direction by hydraulic force so as to generate a mold releasing force. In this case, when mold releasing is started, a brake means for restricting a rotation of the screw member is operated, and hydraulic oil is supplied from a clamping hydraulic source to a mold releasing cylinder mechanism for moving the ball screw member in the axial direction, so that a mold releasing operation is conducted. Next, the brake means is released, and the mold is opened by an electrical operation. After the mold opening motion has been completed, the mold releasing cylinder mechanism is returned to a position of the origin, and then hydraulic oil is enclosed in the mold releasing cylinder mechanism so that it cannot be moved.

The present invention will become more apparent in the accompanying drawings and the detailed description of preferred embodiments of the present invention.

BRIEF DESCRIPTION OF THE DRAWINGS

FIG. 5 is a sectional plan view of a platen lock means having a die-height adjusting mechanism provided in the mold clamping device.

FIG. 24 is a sectional view of a pressurizing mechanism of a clamping device of another embodiment of the present invention.

FIG. 25 is an enlarged sectional view of the pressurizing mechanism of the clamping device shown in FIG. 24.

FIGS. 26A and 26B are schematic illustrations for explaining a protective state of a bladder by a seal member, wherein FIG. 26A is a schematic illustration showing a state before pressurizing the bladder by supplying hydraulic oil, and FIG. 26B is a schematic illustration showing a state after pressurizing the bladder.

FIGS. 33A and 33B are partially enlarged sectional views for explaining a process of intrusion of a tightly closed bladder into a gap in a conventional pressurizing mechanism.

BEST MODE FOR CARRYING OUT THE INVENTION

Referring to the accompanying drawings, an embodiment of a clamping device and a method of releasing a mold of the present invention will be explained, in detail, as follows.

Figure 1:
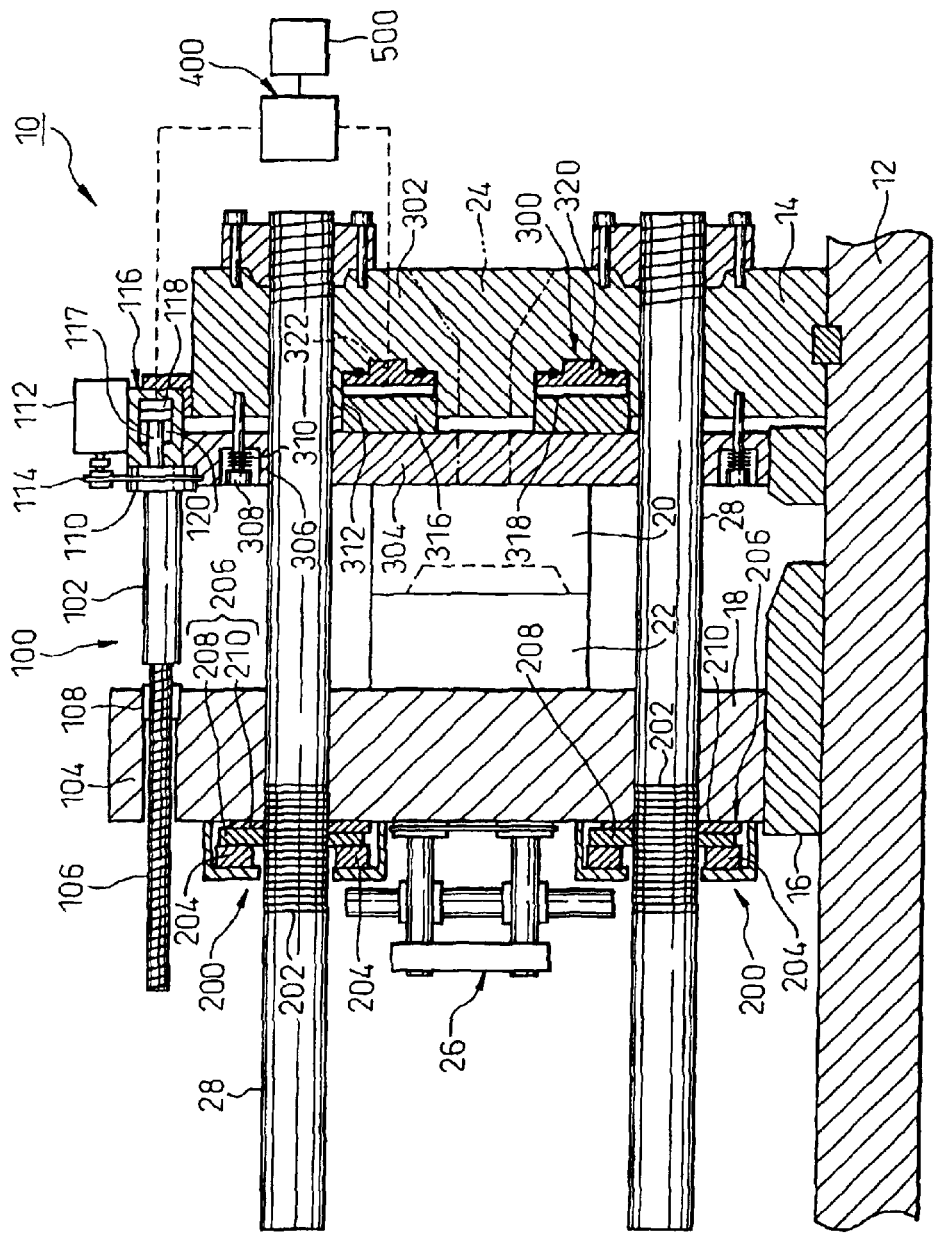
FIG. 1 is a longitudinal sectional view showing an outline of an arrangement of a clamping device of an embodiment of the present invention.
Figure 2:
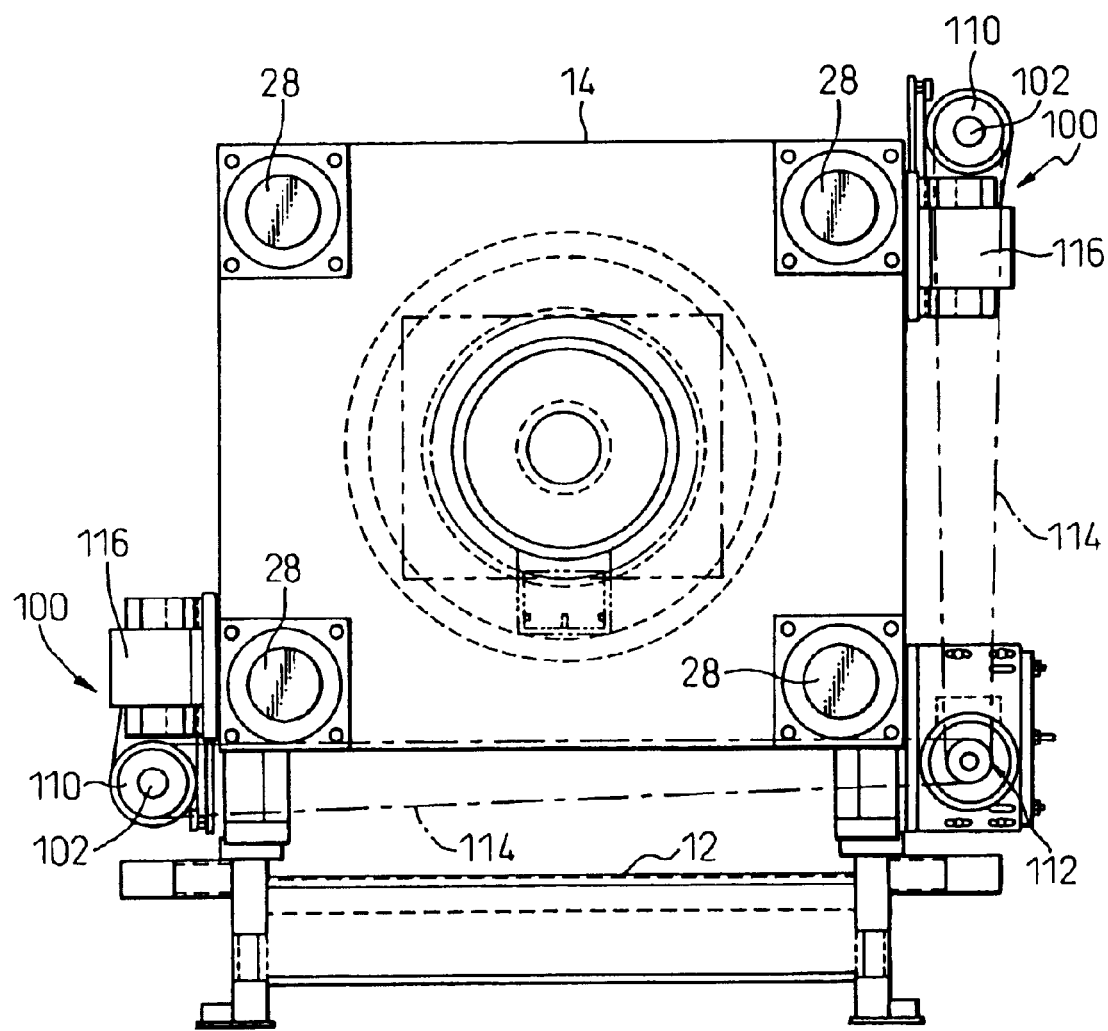
FIG. 2 is a rear view on a stationary platen side of a clamping device.
Figure 3:
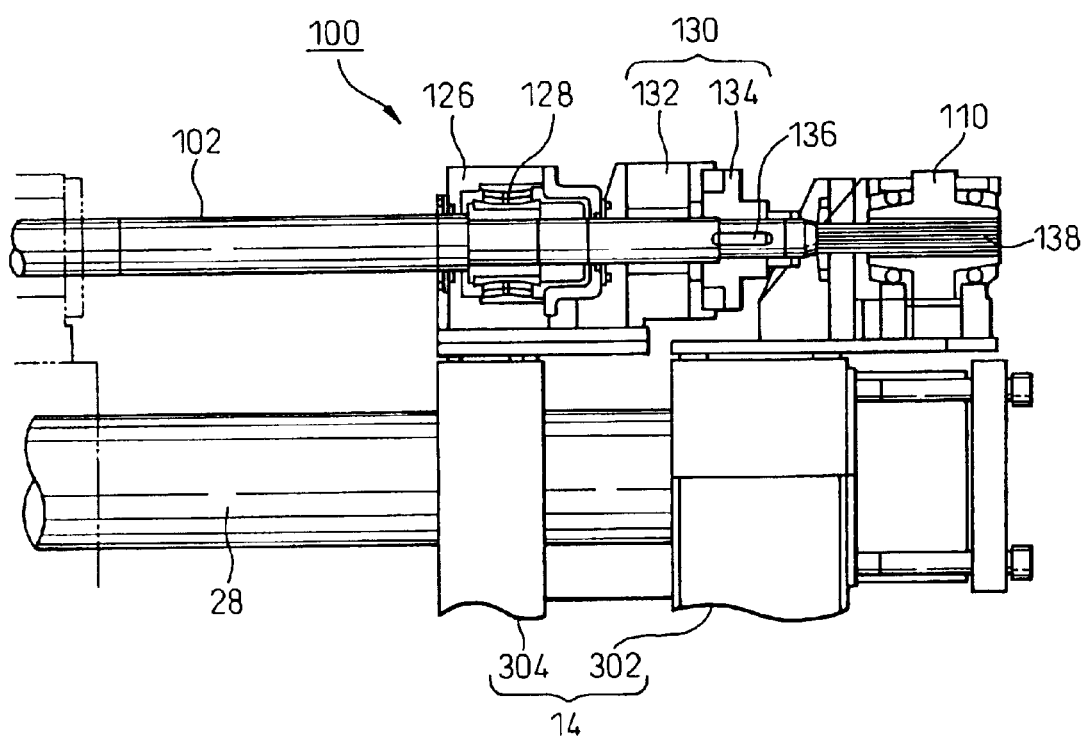
FIG. 3 is a partial sectional view of a mold opening and closing device.
Figure 4:
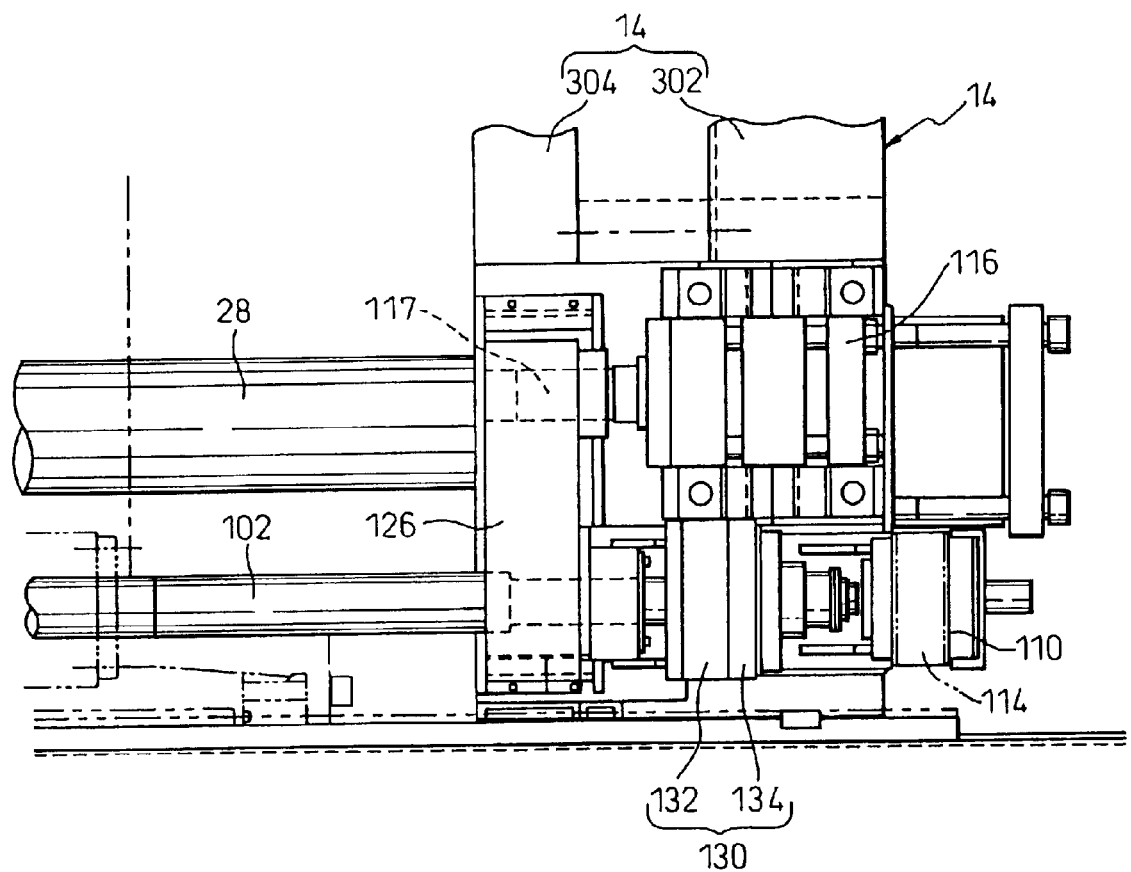
FIG. 4 is a partial appearance view of a mold opening and closing device.

FIG. 1 is a longitudinal sectional view showing a model of a clamping device of an embodiment of the present invention, FIG. 2 is a rear view of a stationary platen, FIG. 3 is a partial sectional view of a mold opening and closing means, and FIG. 4 is an appearance view of a mold opening and closing means.

First of all, as shown in FIG. 1, the clamping device 10 of this embodiment includes: a stationary platen 14 vertically arranged on one end portion of the machine base 12 while a base section of the stationary platen 14 is fixed to the machine base 12 by a key; and a movable platen 18 arranged opposed to this stationary platen 14, the movable platen 18 being capable of sliding on the machine base 12 by a guide shoe 16. A stationary metallic mold 20 and a movable metallic mold 22 are respectively attached to the stationary platen 14 and the movable platen 18. When the movable platen 18 is moved in such a manner that it comes into contact with and separates from the stationary platen 14, the mold can be opened and closed. At the center of the stationary platen 14, there is provided a space 24 into which a portion of an injection molding machine proceeds, so that melted resin can be supplied into a cavity formed by the metallic molds 20, 22. At the center on the movable platen 18 side, there is provided a product pushing device 26, by which a molded product can be ejected from the molds which are open and away from each other.

At the four corners of the stationary platen 14, there are provided rod holes. One end of each tie rod 28 is fixed in each rod hole. In the same manner, at the four corners of the movable platen 18, there are provided rod holes. Each tie rod 28 penetrates each rod hole. Due to the above structure, the movable platen 18 is capable of sliding on the machine base 12 toward the stationary platen 14 while the tie rods 28 are being used as guides.

In the molding work conducted by the clamping device composed of the above essential components, when the movable platen 28 is moved, the molds 20, 23 are closed and locked by the tie rods 28 so that the movable platen 18 cannot be moved. Next, the metallic molds 20, 23 are clamped by a high intensity of force so that the molds cannot be opened in the process of injection molding. After the completion of injection molding, the metallic molds 20, 22 are separated from each other by a force, the intensity of which is approximately one fifteenth of the clamping force, and then the molds are opened so as to take out the molded product out of the molds. In order to accomplish the above series of work, the above clamping device includes: a mold opening and closing means 100 for moving the movable platen 18 between the mold opening position and the mold closing position; a platen lock means 200 for fixing the movable platen 18 to the tie rod 28 by utilizing a split nut; a pressurizing mechanism 300 for generating a clamping force at the mold closing positions of the metallic molds 20, 22; a hydraulic circuit 400 for supplying hydraulic oil to pressurize the metallic molds 20, 22; and a control means 500 for controlling these components. The clamping device of this embodiment adopts a hybrid structure in which a mold opening and closing motion is conducted by the mold opening and closing means 100, which is an opening and closing operation mechanism to be electrically driven, and clamping of the molds is conducted by a hydraulic means.

The following explanations will be made according to the procedure of molding work. That is, first, the mold opening and closing means 100 will be explained. Then, the platen lock means 200 and pressurizing means 300 will be successively explained. Finally, the hydraulic circuit 400 will be explained.

First, the mold opening and closing means 100 is realized by an electrically driven type ball screw mechanism, which is composed as follows. The ball screw member 102 is pivotally supported by the stationary platen 14 and extended toward the movable platen 18 side in parallel with the tie rods 28. On the movable platen 18 opposed to a forward end portion of the ball screw member 102, there is provided a through-hole 104 into which the ball screw member 102 can proceed. To a step portion formed in the opening section of the through-hole 104, the ball nut 108, which is screwed with the screw section 106 of the ball screw member 102, is attached by bolts. Due to the above structure, when the ball screw member 102 is rotated at a constant position on the stationary platen 14, the movable platen 18 moves forward and separates from the stationary platen 14 together with the ball nut 108.

As shown in the rear view of the stationary platen 14 in FIG. 2, this ball screw mechanism is arranged at two positions on the diagonal line of the platen 14. One is a right upper corner in the drawing, and the other is a left lower corner. The above two ball screw mechanisms are rotated synchronously with each other. Therefore, the pulley 110 is attached to the ball screw member 102, and the belt 114 connected with the servo motor 112, which is attached to the stationary platen 14 and used for opening and closing the molds, is drawn to the pulley 110 so that belt 114 can be wound round the pulley 110. In this way, the ball screw member 102 can be rotated.

Due to the above structure, when the servo motor 112 is operated and the ball screw member 102 is rotated, the movable platen 18 proceeds to and retracts from the stationary platen 14 together with the guide shoe 16 by the screwing action of the ball nut 108. In this way, the movable metallic mold 22 attached to the movable platen 18 can be opened and closed with respect to the stationary metallic mold 20.

In this connection, in this clamping device 10, clamping is conducted by the pressurizing mechanism 300 described later, and then injection molding is executed. After this molding work has been completed, the metallic molds 20, 22 adhere to each other. Therefore, this mold opening and closing means 100 is provided with a structure for releasing the molds. For the mold releasing work, it is necessary to give a mold releasing force, the intensity of which is approximately one fifteenth of the intensity of the clamping force. In order to generate this mold releasing force, there is provided a mold releasing cylinder mechanism 116 for moving the ball screw member 102 in the axial direction, and its piston rod 117 is extended by a hydraulic force, so that the ball screw member 102 is moved in the axial direction and the mold releasing force can be generated.

As the appearance is shown in FIG. 4, the mold releasing cylinder mechanism 116 is arranged at a side position of the rotary mechanism transmitting section of the ball screw member 102 and fixed at the stationary platen 14. On the other hand, the piston rod 117 of the mold releasing cylinder mechanism 116 is arranged in such a manner that the extending and contracting direction is parallel to the ball screw member 102, and the ball screw member 102 is connected with the piston rod 117 via the slider block 126. The slider block 126 is capable of sliding on an outer face of the stationary platen 14. As shown in FIG. 3, while the ball screw member 102 is being rotatably supported by the double row tapered roller bearing 128, the ball screw member 102 penetrates the slider block 126 in such a manner that the ball screw member 102 is fixed in the axial direction.

Further, there is provided an electromagnetic brake means 130 for braking a rotation of the ball screw member 102. This electromagnetic brake means 130 includes a stationary unit 132 and a clutch unit 134. The ball screw member 102 loosely penetrates the stationary unit 132, and the stationary unit 132 is attached and supported in such a manner that it is moved integrally with the slider block 126. The clutch unit 134 is attached to the ball screw member 102 via the key 136 so that it cannot be rotated round the ball screw member 102. Accordingly, when the clutch unit 134 is joined to the stationary unit 132 by an electromagnetic input, the brake is applied to the ball screw member 102. When the ball screw member 102 is simply moved in the axial direction, the ball screw member 102 is rotated by the action of the ball nut 108. Therefore, the ball screw member 102 is prevented from rotating by the electromagnetic brake means 130, and an axial force of the ball screw member 102 can be smoothly transmitted to the movable platen 18 as a mold releasing force via the ball nut 108.

On the other hand, as shown in FIG. 3, spline grooves 138 are formed at a shaft end portion of the ball screw member 102. In order to transmit a rotation of the servo motor 112 described before to the ball screw member 102, these spline grooves 138 are engaged with the boss hole of the pulley 110. Due to the above structure, even when the ball screw member 102 is moved in the axial direction by the action of the mold releasing cylinder 116 described before, the rotary drive system is not affected by the movement of the ball screw member 102.

Due to the above structure, in this embodiment, it is possible to execute a mold releasing action by forcibly pushing out the ball screw member 102 onto the movable platen 18 side by hydraulic force.

Next, an explanation will be given of a platen lock means 200 for fixing and holding the movable platen 18 to the tie rod 28 so that the metallic molds can be maintained at the mold closed position after the metallic molds have been closed. This device is arranged in a penetrating portion of the tie rod 28 in the back of the movable platen 18. As shown in FIG. 1, on the outer circumferential face of the middle section of the tie rod 28, a plurality of ring grooves 202 are made at regular intervals. On the other hand, at the rear section of the movable platen 18, the split nut 204 is attached to the movable platen 18 being restricted so that the split nut 204 can be moved in the radial direction of the tie rod 28. The split nut 204 is provided with teeth capable of engaging with the ring grooves 202. When a pair of split nuts 204 are moved while the tie rod 28 is being interposed between the pair of split nuts 204, the split nuts 204 are engaged with the ring grooves 202 of the tie rod 28. Therefore, the movable platen 18 is positioned and fixed to the tie rod 28. The pair of split nuts 204 can be moved being opened and closed in the radial direction of the tie rod 28 by the drive of the nut cylinder. When the movable platen 18 and the movable metallic die 22 are moved being opened and closed, the pair of split nuts 204 are opened in such a manner that they are separated from each other, so that the pair of split nuts 204 are disengaged from the tie rod 28 and held in this disengaged state. When a clamping force is given, the pair of split nuts 204 are closed and moved, so that the teeth of the split nuts 204 are engaged with the ring grooves 202 of the tie rod 28. Due to the foregoing, the movable platen 18 and the tie rod 28 can be engaged with each other at an engaging position.

In this connection, in the above platen lock means 200, the pitch of the ring grooves 202 of the tie rod 28 is the same as the pitch of the engaging teeth of the split nuts 204. However, in the state that the movable metallic die 22 is in contact with the stationary metallic die 20, unless the phase of the ring grooves 202 agrees with the phase of the engaging teeth of the split nuts 204 so that the ring grooves 202 can be appropriately engaged with the engaging teeth of the split nuts 204, it is impossible to hold the movable platen 18 and the tie rod 28 in an appropriate engaging state. Therefore, in the case of replacing the metallic mold, before molding is conducted, it is necessary to adjust an engaging position so that both phases can agree with each other according to the metallic mold thickness (die-height).

Figure 6A:
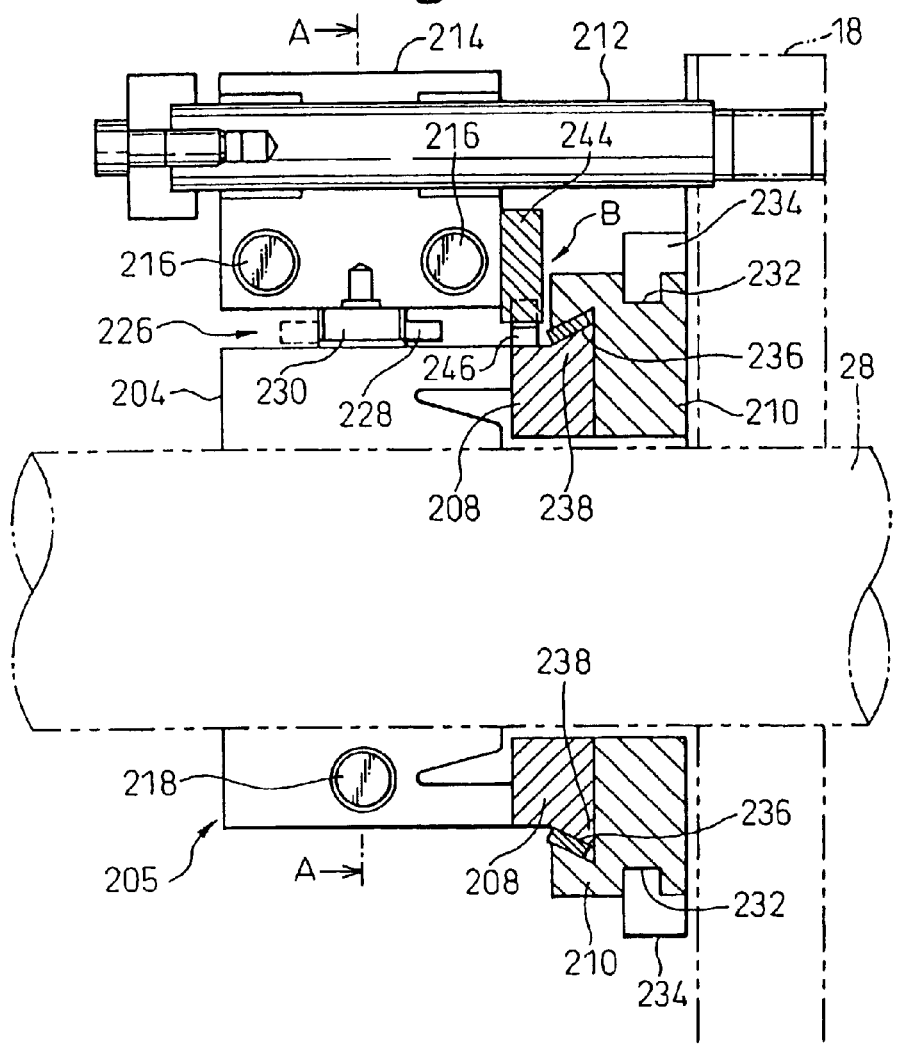
FIG. 6A is a longitudinal sectional view of the platen lock means.

In this embodiment, as shown in FIG. 1, between the platen lock means 200 and the movable platen 18, there is provided a wall thickness changing plate means operated by a wedge action of the stationary wedge 208 and the movable wedge 210 so as to conduct the die-height adjustment. Therefore, as shown in FIG. 6A, the split nut unit 205 (shown in FIG. 5) having a pair of split nuts 204 is attached to the movable platen 18 so that it can be moved in the axial direction of the tie rod 28. The die-height adjusting mechanism 206 composed of the stationary wedge 208 and movable wedge 210 is interposed in a gap formed between the movable platen 18 and the split nut unit 205. That is, the stationary wedge 208 and the movable wedge 210, which are joined to each other on an oblique face, are interposed between the movable platen 18 and the split nut unit 205, and a position of the split nut unit 205 with respect to the movable platen 18 can be set by the total thickness of both the wedges 208 and 210. The stationary wedge 208 is attached to the split nut unit 205 side. On the other hand, the movable wedge 208 is made to be movable in the radial direction of the tie rod 28. While both the wedges 208 and 210 are being connected with the stationary wedge 208 by means of dove-tail groove connection, the movable wedge 210 is attached so that it can be moved in a gap formed between the movable platen 18 and the stationary wedge 208. In this way, it is possible to change a joining thickness of the stationary wedge 208 and the movable wedge 210, so that the split nut 205 can be moved and adjusted in the axial direction of the tie rod 28. Accordingly, only when the movable wedge 210 is moved in the radial direction of the tie rod 28, a distance between the split nut 205 and the movable platen 18 can be changed. Due to the foregoing, it is possible to adjust an engaging position by a simple operation of moving the wedge 210 so that the die-height can be simply changed.

Figure 6B:
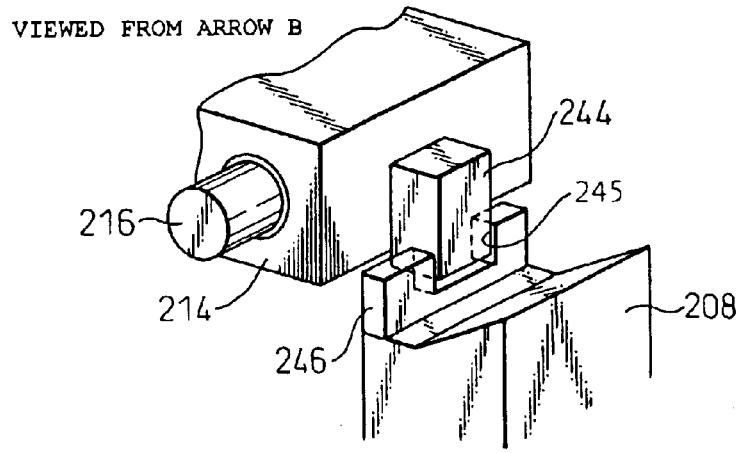
FIG. 6B is a partial perspective view of the platen lock means.
Figure 7:
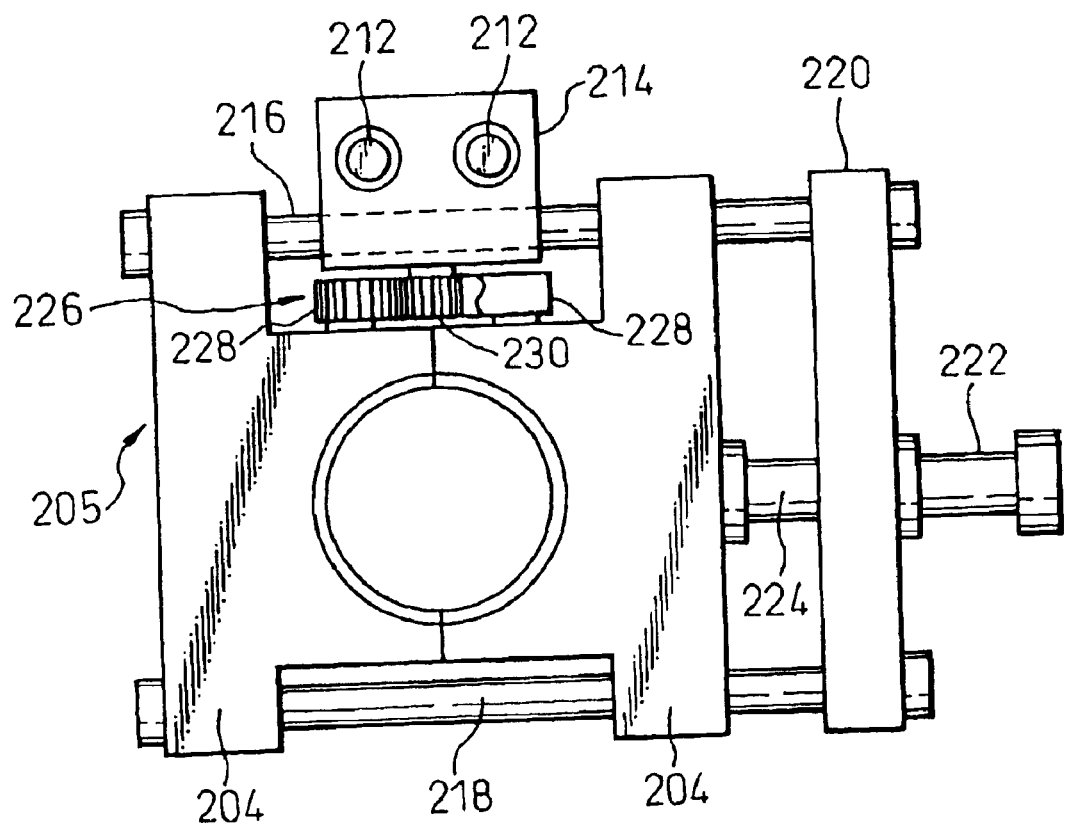
FIG. 7 is a sectional view taken on line A—A in FIG. 6A.
Figure 8:
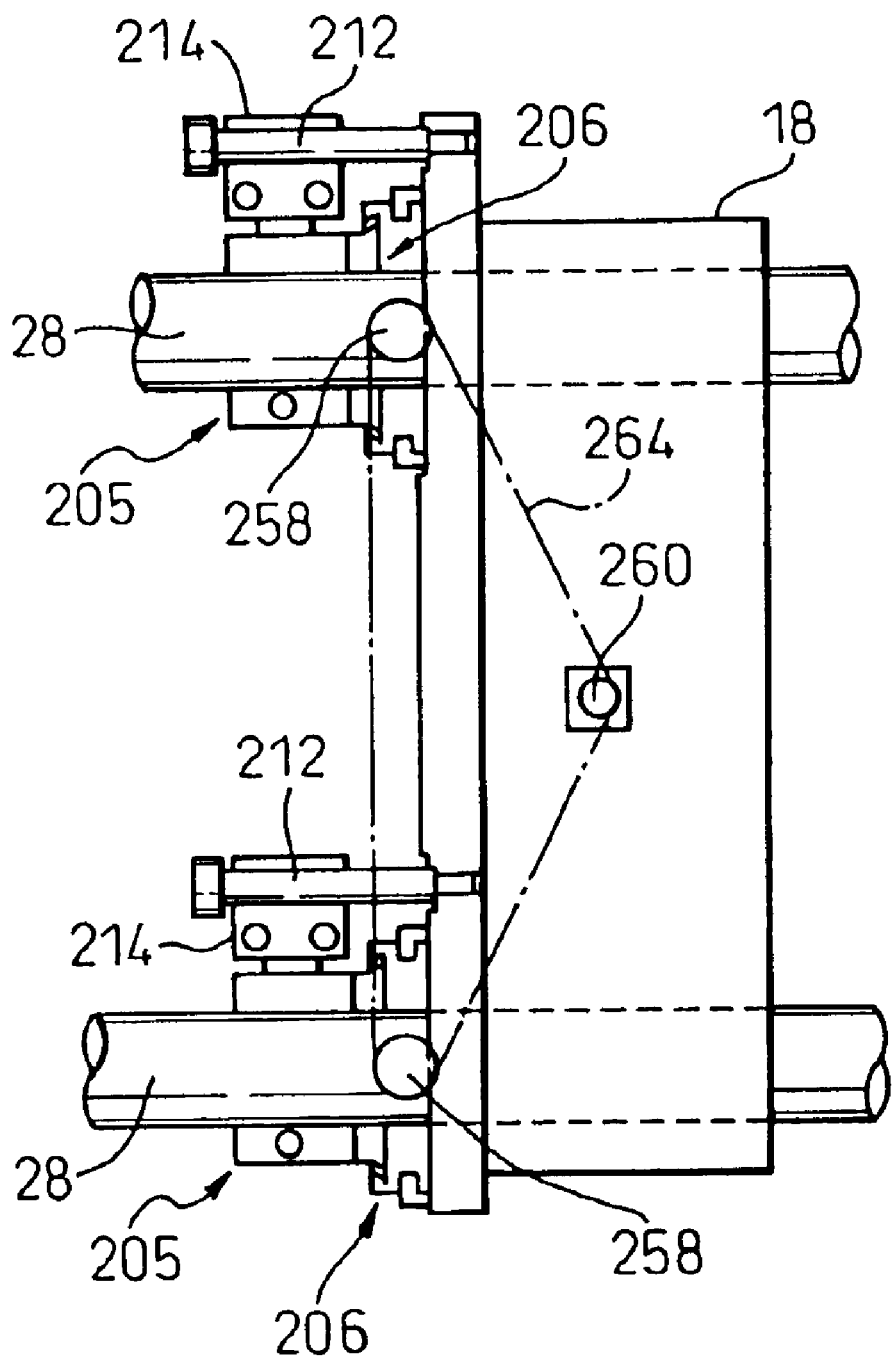
FIG. 8 is a sectional plan view of a platen lock means of a clamping device.
Figure 9:
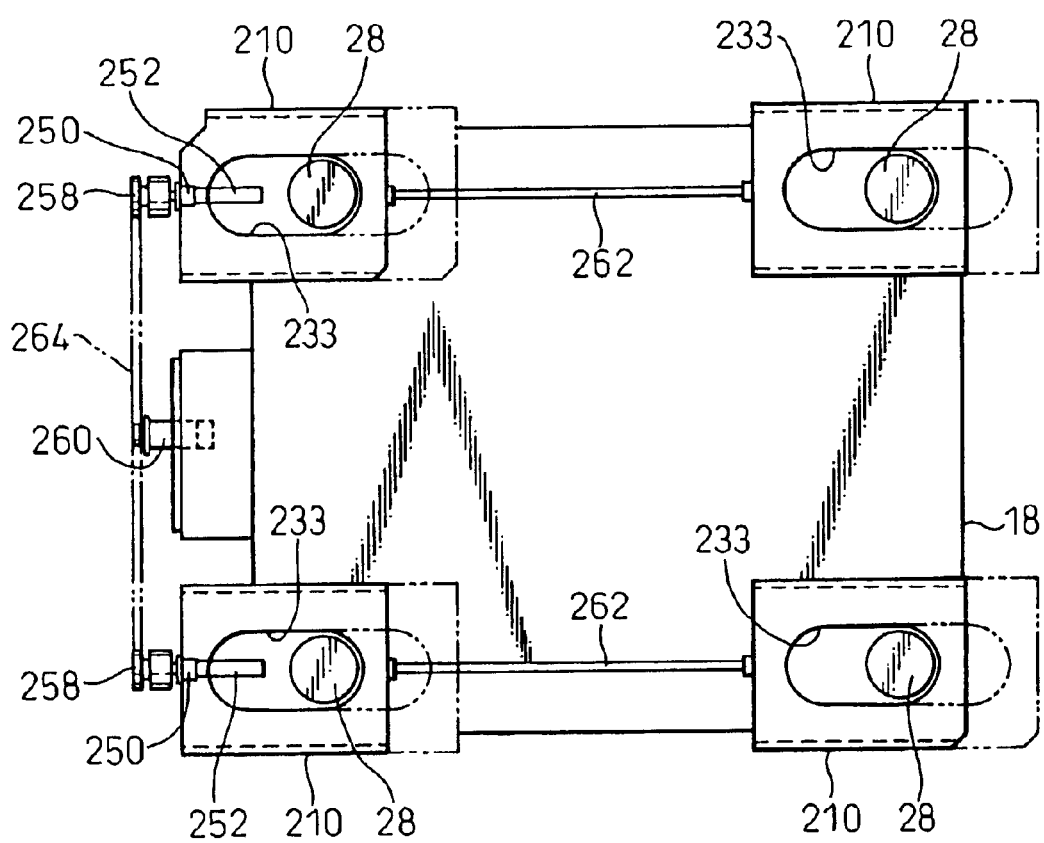
FIG. 9 is a rear view of a movable platen showing a movable wedge drive system.

FIGS. 5 to 9 are views showing the structure in detail. FIG. 5 is a sectional plan view showing a specific structure of the platen lock means 200 having the above die-height adjusting mechanism 206 arranged in each tie rod portion. FIG. 6A is a longitudinal sectional view. FIG. 6B is a partial perspective view. FIG. 7 is a sectional view taken on line A—A in FIG. 6. FIGS. 8 and 9 are views showing a drive system.

First, the structure of the split nut unit 205 will be explained below. As can be seen in FIGS. 6A and 7, this split nut unit 205 includes a support block 214 slidably attached to the two support rods 212 attached to the rear face of the movable platen 18. The support rods 212 are attached in an upper portion of the tie rod 28 in parallel with the tie rod 28. Accordingly, the support block 214 can be moved in the axial direction of the tie rod. Two nut guide rods 216, which are arranged perpendicular to the support rods 212, horizontally penetrate the support block 214. A pair of split nuts 204 are attached onto both sides of the nut guide rods 216 while the support block 214 is interposed between the pair of split nuts 204. Due to the above structure, the pair of split nuts 204 can pinch the tie rod 28 from both sides. The nut guide rod 218 penetrates a lower portion of the split nut 204. Therefore, the pair of split nuts 204 can be opened and closed in parallel.

Ends of the upper and the lower nut guide rods 216, 218 are fixed to the left split nut 204 as shown in FIG. 7, and the upper and the lower nut guide rods 216, 218 penetrate the right split nut 204. The upper and the lower nut guide rods 216, 218, which penetrate the right split nut 204, are connected with and fixed to the cylinder attaching plate 220 to which the air cylinder 222 is attached. The rod 224 of the air cylinder 222 is connected with the right split nut 204. When this air cylinder 222 acts, the right and the left split nut 204 can be opened and closed. In order to synchronously open and close the pair of split nuts 204, the pinion rack mechanism 226 is arranged in a portion where the support block 214 and the split nut 204 are opposed to each other. As shown in FIG. 5, a pair of racks 228 are respectively fixed to the right and the left split nut 204 and arranged in parallel with each other while the tooth faces of the racks 228 are being opposed to each other. The pinion gear 230 engaging with both racks 228 is attached to the support block 214 side (Refer to FIGS. 6A and 7.). When the rod 224 of the air cylinder 222 is extended and contracted, the pair of split nuts 204 can be equally synchronously opened and closed with respect to the tie rod 28.

The die-height adjusting mechanism 206 is interposed between the split nut unit 205 and the movable platen 18 composed as described above. As shown in FIG. 5, there are provided the stationary wedge 208 and movable wedge 210, the oblique faces of which are joined to each other, in the rear face portion of the movable platen 18. The stationary wedge 208 is formed into a wedge shape, one face of which is oblique in such a manner that one end portion of the stationary wedge 208 is thin and the wall thickness is gradually increased as it comes to the other end portion. On the other hand, the movable wedge 210 is formed into a reverse wedge shape. When the oblique face of the stationary wedge 208 and that of the movable wedge 210 are joined to each other, while the joined wall thickness is made uniform as a whole, the thickness can be changed. When both wedges 208 and 210 are relatively displaced along the oblique faces, the joined wall thickness can be changed. Accordingly, when this wedge mechanism is interposed between the split nut unit 205 and the rear face of the movable platen 18, it is possible to change the lock position determined by the split nut 204 with respect to the movable platen 18. In order to prevent both wedges 208 and 210 from interfering with the tie rod 28, on the stationary wedge 208 side, there is provided a circular through-hole 231, the diameter of which is a little larger than that of the tie rod 28, and on the movable wedge 210 side, there is provided an oval-shaped through-hole 233.

In this embodiment, as shown in FIG. 6A, the traverse guide grooves 232 are formed on an upper and a lower end face of the movable wedge 210. On the rear face of the movable platen 18, there are provided guide pawls 234 engaging with the above traverse guide grooves 232, so that the movable wedge 210 can be moved in the traverse direction along the rear face of the movable platen 18. On the oblique face of the movable wedge 210, there is provided a dove-tail groove 236, the width of which is constant. On the other hand, in the stationary wedge 208, the oblique face of which is joined to that of the movable wedge 210, there is provided a dove-tail 238. Both are slidably joined to each other along the oblique face under the condition that the dove-tail 238 cannot be drawn out from the dove-tail groove 236.

The stationary wedge 208 is attached to the split nut 205. As shown in FIG. 5, on the right and the left end face of the stationary wedge 208, the restricting grooves 240 are formed. On the other hand, in each of the right and the left split nut 204, the restricting protrusion 242 to be engaged in the above restricting groove 240 is provided. The engaging length of the restricting protrusion 242 is set so that the restricting protrusion 242 can stay in the restricting groove 240 even when the pair of split nuts 204 have been separated from each other in the case of releasing the lock. When the split nut 204 is opened, the restricting width of the stationary wedge 208 is extended. Therefore, it is necessary to prevent the stationary wedge 208 from swaying in the traverse direction. As shown in FIGS. 6A and 6B, the sway preventing mechanism is composed as follows. In the support block 214 of the split nut unit 205, there is provided a sway preventing key 244 which is protruding toward an upper end face of the stationary wedge 208. On the stationary wedge 208 side, there is provided a sway preventing block 246 in which the engaging groove 245 of the key 244 is formed. Therefore, even when the split nut 204 is open, the stationary wedge 208 can be held at a predetermined position.

The above die-height adjusting mechanism 206 is capable of adjusting an engaging position of the split nut unit 205 by changing the wedge thickness when the above movable wedge 210 is traversed. This operation is conducted by the ball screw mechanism 248 provided in the movable wedge 210. That is, as shown in FIG. 5, the ball nut 250 is fixed at an end face portion of the movable wedge 210 on the maximum thickness side and screwed to the ball screw 252.

This ball screw 252 is pivotally supported by the bearing 256 provided in the bracket 254 fixed onto an external end face of the movable platen 18 which is protruded from an end face of the movable wedge 210. The pulley 258 is attached to a forward end portion of the ball screw 252 and driven by the motor 260 (shown in FIG. 8).

The platen lock means 200 provided with the die-height adjusting mechanism 206 is arranged at each tie rod 28. Therefore, in the example shown in the drawing, the platen lock means 200 are arranged at four positions. In order to operate these four platen lock means 200 by one drive source, in the embodiment, as shown in FIGS. 8 and 9, the right and the left movable wedge 210, which are arranged in the movable direction of the movable wedge 210, are connected with each other by the connecting rod 262, so that the right and the left movable wedge 210 can be moved while being linked with each other. In order for the upper and the lower movable wedge 210 to be linked with each other, the pulley 258 and the motor 260 are connected with each other by the winding belt 264 (shown in FIG. 8), so that the die-height adjustment can be synchronously conducted at all positions.

In the die-height adjusting mechanism 206 composed as described above, when the motor 260 is driven so as to rotate the ball screw 252, the ball nut 250 arranged in the movable wedge 210 is screwed and moved forward. Due to the foregoing, a plurality of movable wedges 210 are linked with each other, so that the joining thickness of the wedges 208, 210 can be changed. Therefore, an engaging position of the split nut unit 205 with the tie rod 28 is changed in the axial direction. Accordingly, the phase of engagement can be changed according to the change in the die-height.

In the case where the die-height is changed when the metallic molds 20 and 22 are replaced, a stopping position of the movable platen 18 can be detected by a position sensor when the metallic molds are closed by the mold opening and closing means 100. On the other hand, since the position and the pitch of the ring grooves 202, which are formed on the tie rod 28, and the position and the pitch of the engaging teeth of the split nut 204 are already been known, the control means 500 is capable of finding a quantity of difference of the phase between the split nut 204 and the ring grooves 202 by calculation. A relation between the quantity of insertion of the movable wedge 210 of the die-height adjusting mechanism 206 and the joining thickness of the wedge is already known. Therefore, a quantity of movement of the movable wedge 210 necessary for correcting a difference in the engaging phase can be found by calculation. The control means 500 calculates a necessary quantity of movement of the movable wedge 210 and outputs the result of calculation as a quantity of rotation of the wedge drive motor 260.

Rotation of the wedge drive motor 260 is transmitted to the pulley 258 of the ball screw 252, which is arranged in a pair of die-height adjusting mechanisms 206, through the winding belt 264. Due to the foregoing, the ball screw 252 is rotated, and the movable wedge 210 at which the ball nut 250 is fixed is moved in the traverse direction in FIGS. 5 and 9. The movable wedges 210 of the die-height adjusting mechanisms 206, which are arranged in the traverse direction, are synchronously driven by the connecting rod 262. Accordingly, the movable wedges 210 of the four die-height adjusting mechanisms 206 are moved by the same distance of movement. Due to the foregoing, the stationary nut 208, the oblique face of which is joined to that of the movable wedge 210, is moved in the axial direction of the tie rod 28, so that the split nut unit 205 is displaced along the support rod 212. Accordingly, the split nut 204 is moved and adjusted by a quantity of difference of the phase in the axial direction of the tie rod 28. Accordingly, when the tie rod 28 is interposed by the spit nuts 204, it is possible to conduct locking while the phase of the engaging teeth on the nut side is made to agree with the phase of the ring grooves 202.

Figure 10A:
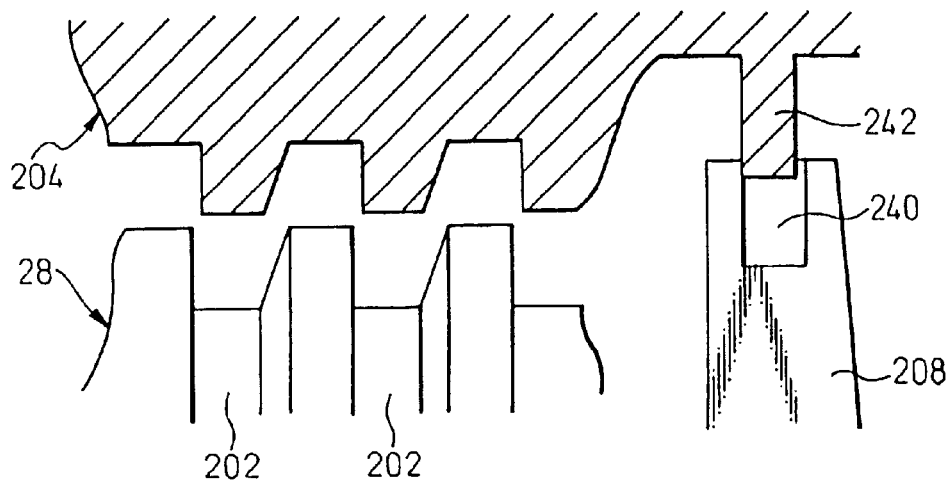
FIGS. 10A, 10B and 10C are schematic illustrations showing a state of engagement of a platen lock means with tie rods.
Figure 10B:
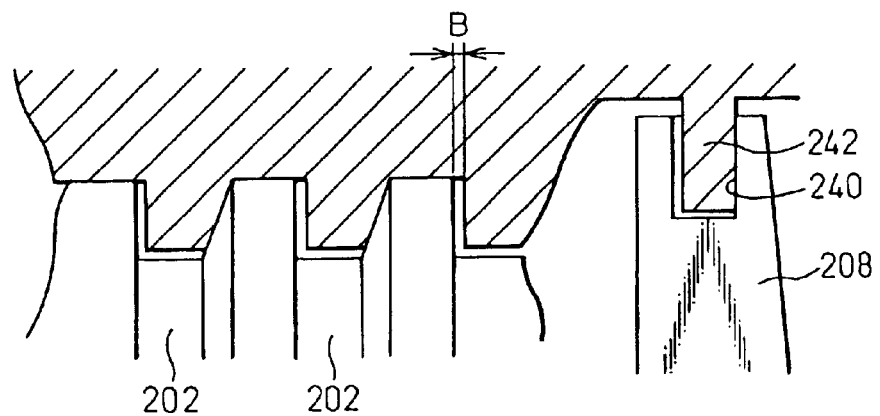
Figure 10C:
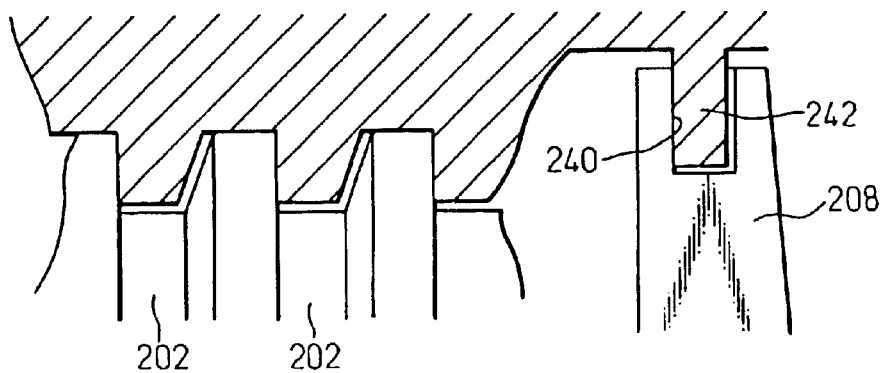

In this connection, as shown in FIGS. 10A to 10C, backlash B exists between the ring groove 202 and the split nut 204. Therefore, a small difference between the engaging positions can be allowed.

Next, after the mold closing motion has been completed by operating the above platen lock means 200, the mold clamping work is started. Explanations will be made into the structure of the pressurizing mechanism 300 to generate a clamping force in the mold clamping device 10.

As shown in FIG. 1, the stationary platen 14 includes: a platen body 302 directly fixed to the machine base 12; and a pressurizing plate 304 to which the stationary metallic mold 20 is attached. The stationary platen 14 is set in such a manner that the pressurizing plate 304 can be separated from the platen body 302 in a range of the mold clamping stroke. The tie rods 28 penetrate the tie rod holes formed at four corners on the pressurizing plate 304. The stationary metallic mold 20 is attached at the center of the pressurizing plate 304 opposed to the movable platen 18. Further, as shown in detail in FIG. 11, a plurality of through-holes 306 having a step portion, which are formed from the metallic mold attaching face side of the pressurizing plate 304, are provided in the circumferential direction. The connecting bolts 308 are inserted into these through-holes 306, so that the pressurizing plate 304 can be connected with the platen body 302 by means of screws. The coned disc spring 310 is accommodated between the step portion of each through-hole 306 having a step portion and the head portion of the connecting bolt 308. By the action of the coned disc spring 310, the pressurizing plate 304 can be usually held in a condition in which the pressurizing plate 304 is joined to the platen body 302. In the case where a mold clamping force is generated, the coned disc spring 310 is deflected, so that the pressurizing plate 304 can be moved in the mold clamping direction by a mold clamping stroke.

Figure 11:
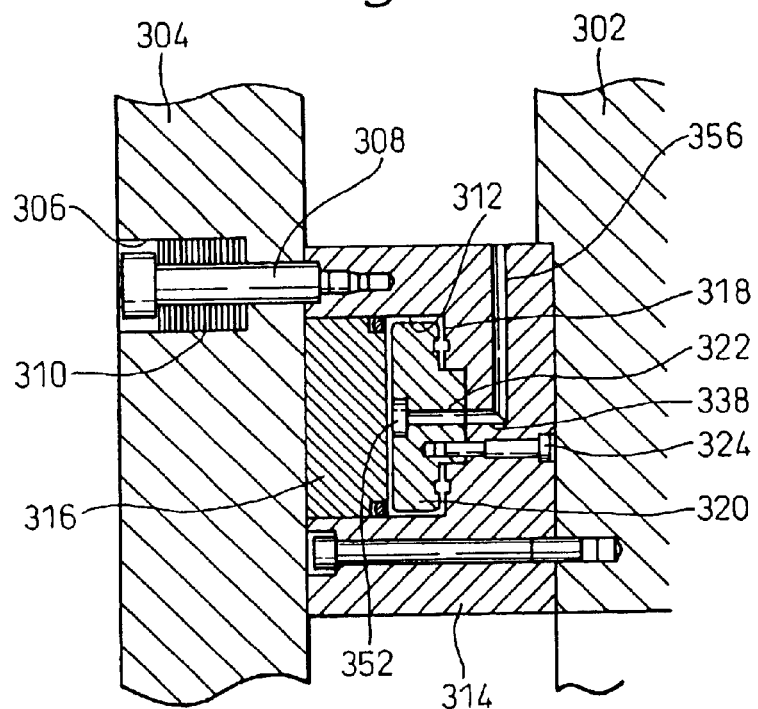
FIG. 11 is a sectional view of a pressurizing mechanism portion of an upper portion of a clamping device.
Figure 12:
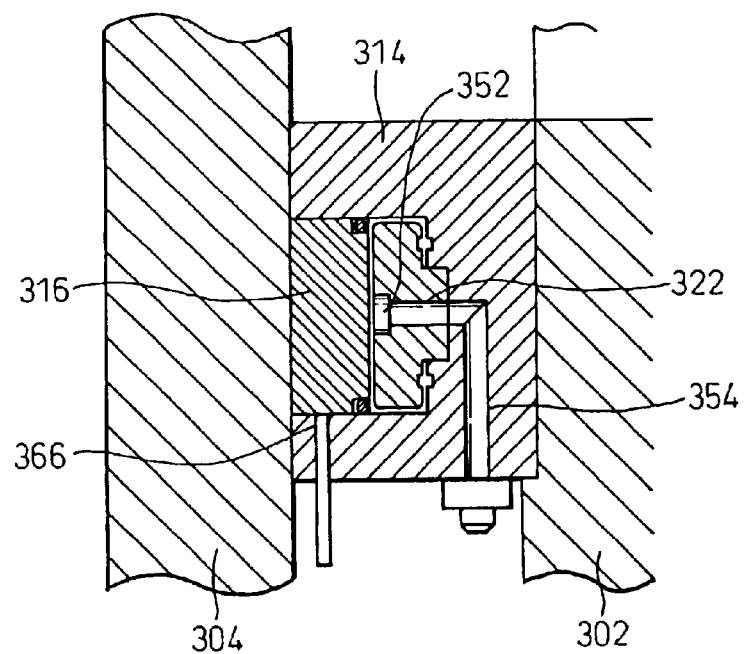
FIG. 12 is a sectional view of a pressurizing mechanism portion of a lower portion of a clamping device.

In order to make the pressurizing plate 304 conduct a mold clamping action, the annular groove-shaped cylinder 312 is formed in the platen body 302 and opened to the opposing section of the pressurizing plate 304. Actually, as shown in FIGS. 11 and 12, the annular cylinder block 314 is integrally formed in the platen body 302 in such a manner that the annular cylinder block 314 surrounds the space 24 into which an injection molding machine proceeds (shown in FIG. 1). The cylinder 312 is formed in this cylinder block 314. The piston 316 is slidably attached into an opening section of the cylinder 312. By the pushing action of this piston 316, the pressurizing plate 304 can conduct a mold clamping action. This piston 316 can be pushed out by hydraulic pressure. Therefore, in a space, which becomes a hydraulic chamber, surrounded by the bottom portion of the cylinder 312 and the piston 316, there is provided a bladder 318 which is expanded and contracted when hydraulic oil is supplied to and discharged from it. By the action of this bladder 318, the piston 316 can be pushed out. This bladder 318 is made of oil-proof rubber and, for example, this bladder 318 is made of flexible material such as nitrile rubber used as a material for O-rings. This bladder 318 is accommodated in the space without leaving any gap. When this bladder 318 is expanded and contracted by supplying hydraulic oil, which is pressurized and controlled by the hydraulic circuit 400 described later, into this bladder 318 or by discharging hydraulic oil from this bladder 318, the piston 316 can be moved in the cylinder.

In this connection, in the case where the bladder 318 is used for clamping the metallic molds 20, 22 in the horizontal direction and a pressurizing force is generated by this bladder 318 when hydraulic oil is supplied to and discharged from the space tightly closed by the bladder 318, it is necessary to completely discharge air from the bladder 318 when hydraulic oil is charged into the bladder 318. Unless air is completely discharged from the bladder 318, the clamping force is not appropriately given to the metallic mold. It is very difficult to form the bladder 318, into which hydraulic oil is charged, according to a volume of the closed stationary space. As the bladder is deformed, there is a possibility that hydraulic oil leaks out from the bladder because the bladder is damaged. Therefore, it is impossible to increase a mold clamping force.

In order to solve the above problems, in this embodiment, the insert die 320, the shape of which is identical with the internal shape of the bladder 318, is housed in the bladder 318, and an opening edge portion of the bladder 318 is pinched and fixed between the insert die 320 and the cylinder 312, and hydraulic oil is supplied into the bladder 318 through the hydraulic path 322 formed in the insert die 320.

Figure 13:
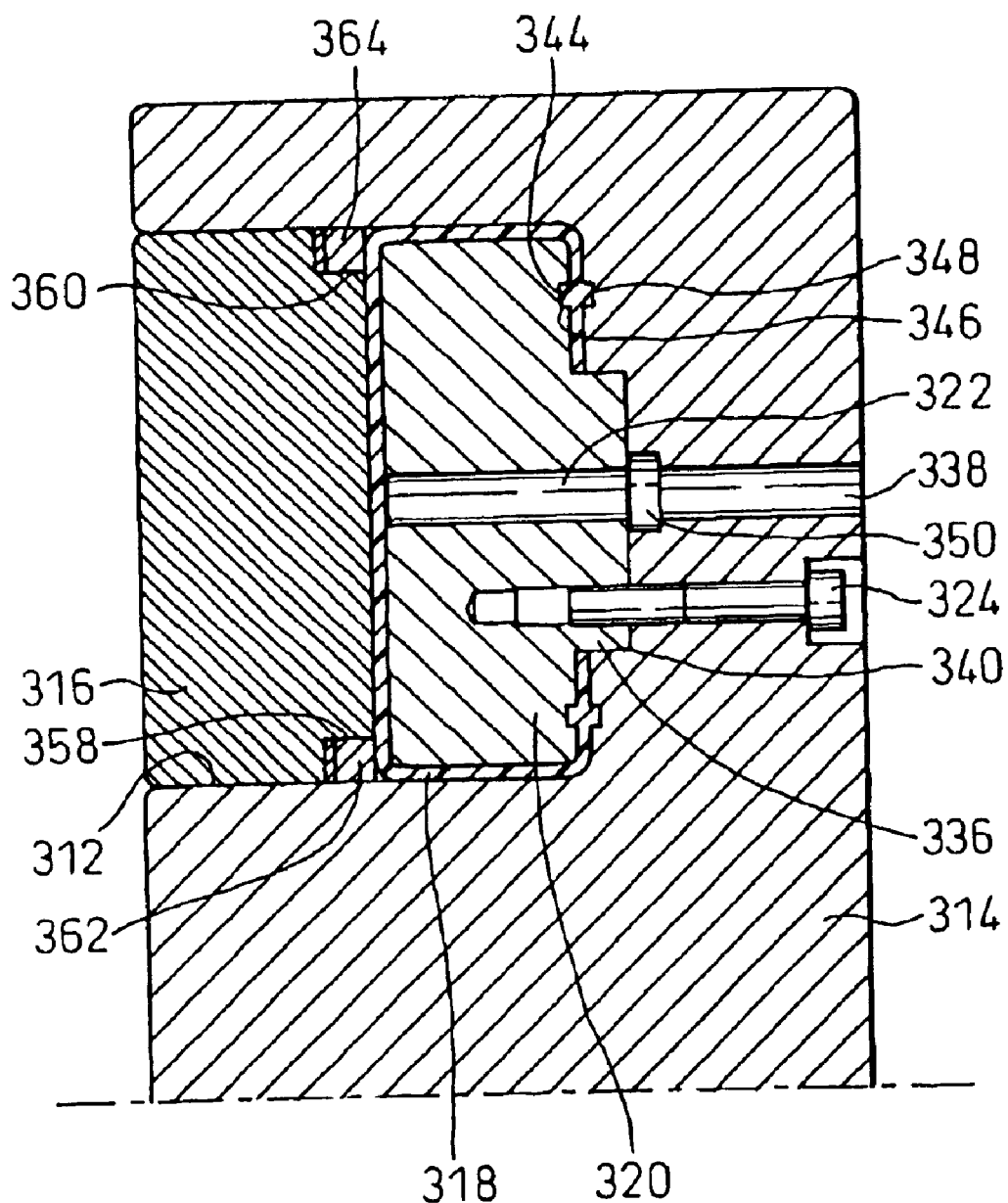
FIG. 13 is an enlarged sectional view of a pressurizing mechanism in an unpressurized state of an embodiment of the present invention.
Figure 14:
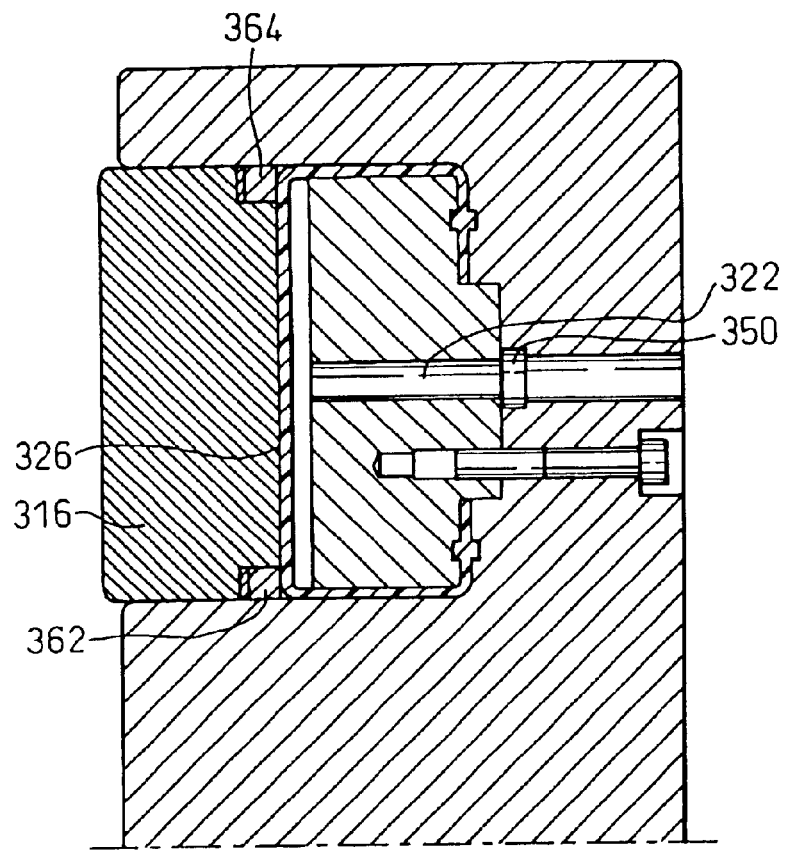
FIG. 14 is an enlarged sectional view in a pressurized state in which hydraulic oil is supplied to a pressurizing mechanism of an embodiment of the present invention.

FIGS. 13 and 14 are views showing, in detail, the pressurizing mechanism 300 into which the bladder 318 is incorporated. FIG. 13 shows an unpressurized state in which hydraulic oil is not supplied, and FIG. 14 shows a pressurized state in which hydraulic oil is supplied. The piston 316 is inserted onto the opening side of the cylinder 312 formed in the cylinder block 314. In a rear space of this piston 316, the insert die 320 is accommodated which is fixed to the cylinder block 314 by the fastening bolt 324. The insert die 320 is formed into a shape by which almost all the above space is occupied. Therefore, a cross section of the space formed along the inner wall face is a C-shape, that is, a thin C-shaped gap is formed. The bladder 318, which is made of a thick rubber sheet filling this C-shaped cross section gap, is attached onto the outer circumferential face of the above insert die 320 and fixed between the insert die 320 and the cylinder 312.

Figure 15:
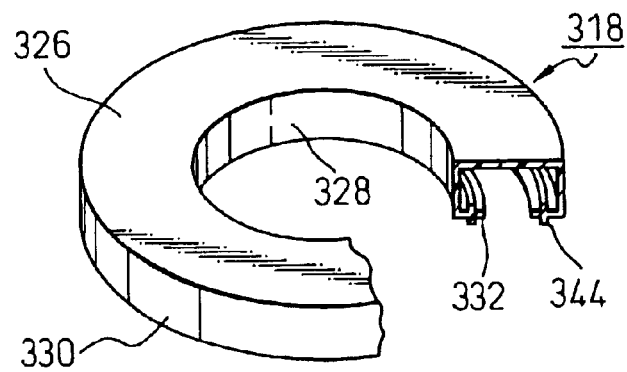
FIG. 15 is a partial sectional perspective view of a bladder.
Figure 16:
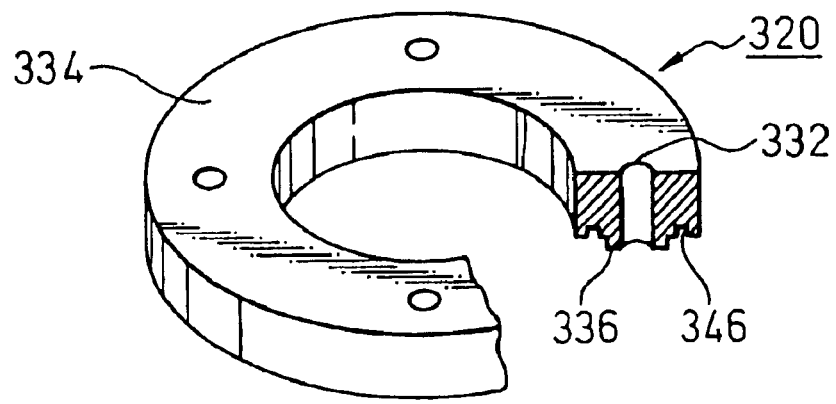
FIG. 16 is a partial sectional perspective view of an insert die.

The appearances of the bladder 318 and the insert die 320 are shown in FIGS. 15 and 16. As shown in FIG. 15, the entire bladder 318 is formed into an annular profile so that it can surround the space 24 (shown in FIG. 1) into which an injection molding device proceeds. The bladder 318 includes: a piston contact portion 326 directly coming into contact with the piston 316; an inner circumferential face portion 328 which is folded at the inner circumferential edge perpendicularly to the piston contact portion 326 and capable of coming into contact with a wall face of the cylinder section; and an outer circumferential face portion 330 which is folded at the outer circumferential edge perpendicularly to the piston contact portion 326 so that the outer circumferential face portion 330 can be contacted with a wall face of the cylinder 312. Further, there are provided a pair of ear pieces 332 which are folded at the end edges of the inner circumferential face 328 and the outer circumferential face 320 in parallel with the piston contact portion 326. A space formed between the opposed ear pieces 332 is open, and the insert die can be attached from this opening.

As shown in FIG. 16, the insert die 320 includes an insert die body 334 having a space surrounded by the piston contact portion 326, inner circumferential face 328, outer circumferential face 330 and ear pieces 332. The insert die 320 further includes a protruding portion 336 which protrudes from the opening of the bladder 318 and forms an attaching face to be attached to the cylinder block 314. Therefore, the entire insert die 320 is formed into a ring shape, the cross section of which is formed into a convex-shape. This insert die 332 is inserted into and tightly contacted with the bladder 318. In this insert die 332, there are provided a plurality of hydraulic paths 322 which are formed from the protruding portion 336 toward the inner face of the piston contact portion 326 of the bladder 318. As shown in FIG. 16, a plurality of hydraulic paths 322 are provided at appropriate regular intervals along the circumferential line of the annular insert die 320. In the example shown in the drawing, four hydraulic paths 322 are provided. When hydraulic oil is supplied to the bladder 318 through these hydraulic paths 322, the bladder 318 can be expanded.

The bladder 318 in which the insert die 320 is housed is fixed to a bottom portion of the cylinder 312. As shown in FIGS. 13 and 14, there is provided a receiving recess portion 340 at the bottom portion 312 of the cylinder 312. The protruding portion 336 of the insert die 320 is engaged in the receiving recess portion 340. The insert die 320 is fixed by the fastening bolts 324. The ear pieces 332 of the bladder 318 are engaged with the step portions provided on both sides of the protruding portion 336. In this way, the inside of the bladder 318 is formed into a tightly closed space. On front and back faces of the bladder ear pieces 332 arranged between the insert die 320 and the bottom portion of the cylinder 312, as a portion is shown in FIG. 15, there are provided protrusions 344 which are perpendicular to the ear pieces 332 being formed into a cross. On the other hand, on the insert die 320 side, there are provided engaging grooves 346 for receiving the protrusions 344 as shown in FIG. 16. In the same manner, there are provided engaging grooves 348 at the bottom portion of the cylinder 312 as shown in FIG. 13. Due to the above structure, it is possible to prevent the bladder 318, into which hydraulic oil is supplied, is drawn out from the insert die 320. A fastening interference of the fastening bolt 324 is made to be smaller than the wall thickness of the bladder ear piece 332 so as to provide a sealing function of sealing hydraulic pressure at the fastening portion.

As shown in FIG. 13, the bladder 318 in which the insert die 320 is housed is attached in the cylinder 312. When hydraulic oil is supplied to an inner face portion of the piston contact portion 326 of the bladder 318, the bladder 318 is expanded in the cylinder 312, and the piston contact portion 326 proceeds forward so that the piston 316 can be pushed out as shown in FIG. 14. Hydraulic oil is supplied through the hydraulic paths 322 described before. As shown in FIGS. 13 and 14, the annular hydraulic path 350 is formed in the receiving recess portion 340 in the cylinder block 314. Alternatively, as shown in FIGS. 11 and 12, the annular hydraulic path 352 is formed on a surface of the insert die body 334 which is opposed to the piston contact portion 326 of the bladder 318. In this way, a plurality of hydraulic paths 322 are communicated with each other. As shown in FIG. 12, hydraulic oil is introduced through the supply oil path 354 formed in the cylinder block 314. The supply oil path 354 is connected with the hydraulic circuit 400 described later. As shown in FIG. 11, at least on the upper side of the cylinder block 314, there is provided an air bleed path 356 communicating with the neighborhood hydraulic path 338, so that air bleeding can be conducted when hydraulic pressure is introduced at the initial stage. After hydraulic oil has been introduced at the initial stage, the air bleeding path 356 is plugged.

In this embodiment, as shown in FIG. 13, in the piston 316 inserted into the cylinder 312, there are provided cut-out portions 358, 360 which are respectively formed at the circumferential edges opposed to the inner and the outer edge corner of the piston contact portion 326 of the bladder 318. In these cut-out portions 358, 360, the piston rings 362, 364 made of soft material such as woven fiber are attached, so that a pushing force given from the inner and the outer circumferential edge of the bladder 318 can be received. In the bladder 318 made of rubber which is repeatedly expanded and contracted, the corners are intensely deteriorated. Therefore, when hydraulic pressure is directly received by the piston 316 and the bladder 318 slides on the cylinder wall face, there is a possibility that the bladder 318 is damaged. Therefore, when the corners of the bladder are received by the piston rings 362, 364 made of soft material in which fibers are woven, deterioration and damage of the bladder 318 can be greatly reduced.

In this embodiment, as shown in FIG. 12, there is provided an oil leakage inspection hydraulic path 366 on the sliding face of the piston 316 in the cylinder 312. Since hydraulic oil, which has leaked out from the bladder 318 when it is damaged, is detected through this inspection hydraulic path 366, it is possible to find a leakage of hydraulic oil early.

Figure 17:
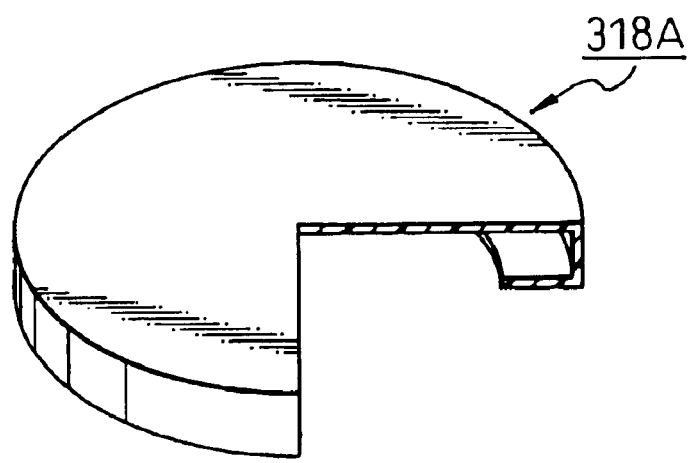
FIG. 17 is a partial sectional perspective view of another embodiment of a bladder.

In this connection, in the above embodiment, the bladder 318 is formed into an annular shape because of the existence of the space 24 into which an injection molding machine proceeds. However, it is possible to adopt an arrangement in which the bladder is formed into a small disk-shaped bladder, and a plurality of small disk-shaped bladders are arranged around the space 24 into which an injection molding machine proceeds. Of course, in the case where no obstacles exist, such as in a space into which an injection molding machine proceeds, it is possible to form the bladder into the large disk-shaped bladder 318A shown in FIG. 17 and arrange it on the front face of the middle section of the stationary platen.

Figure 18:
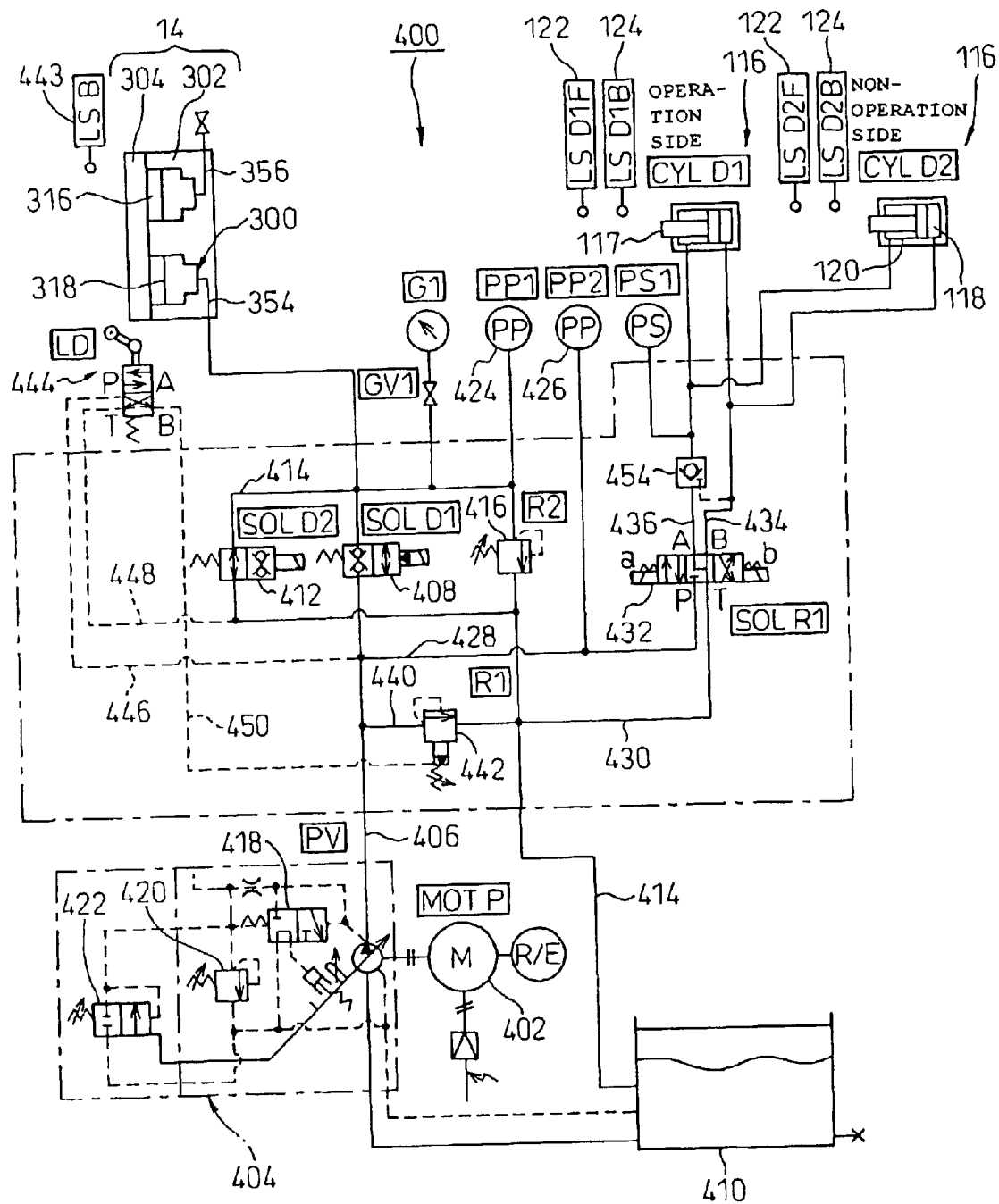
FIG. 18 is a hydraulic circuit of a clamping device of an embodiment of the present invention.

Next, referring to FIG. 18, explanations will be made into a hydraulic circuit 400 for supplying hydraulic oil to the above pressurizing mechanism 300. As shown in the drawing, in this hydraulic circuit 400, hydraulic oil is supplied to the bladder 318 by means of a variable delivery piston pump by which constant torque control can be accomplished when the pump is driven by the reversible motor 402. In this embodiment, the swash plate type pump 404 is used as this variable delivery piston pump. However, it is also possible to use an angled piston pump.

The hydraulic oil supply path 406 connected with a discharge port of the swash plate type pump 404 is connected with the supply oil path 354 of the pressurizing mechanism 300, and the supply path of hydraulic oil can be opened and closed by the opening and closing action of the first solenoid valve 408 arranged in the middle of the hydraulic oil path. When the first solenoid valve 408 is closed, the hydraulic path connected to the bladder 318 is locked, and hydraulic pressure on the bladder 318 side can be enclosed. Accordingly, the first solenoid valve 408 functions as an opening and closing control valve for containing hydraulic pressure. The discharge port side of the first solenoid valve 408 is connected with the return hydraulic oil path 414 to the tank 410 to which the second solenoid valve 412 is attached. When the second solenoid valve 412 is opened and closed, the hydraulic path between the bladder 318 and the tank 410 can be shut off and opened. This second solenoid valve 412 functions as an opening and closing control valve for releasing clamping pressure. Accordingly, the first solenoid valve 408 has a structure in which the valve is closed at all times, and the second solenoid valve 412 has a structure in which the valve is opened at all times. There is provided a relief valve 416 in parallel with the second solenoid valve 412. In the case where the inner pressure in the bladder 318 is abnormally raised by the action of the injection pressure, the inner pressure in the bladder 318 can be released to the tank 410 side.

In this connection, the swash plate type pump 404 houses a swash plate angle adjusting valve 418 capable of adjusting torque by automatically changing the swash plate angle for controlling torque at a constant value when the pump discharge pressure is raised. In the swash plate type pump 404 shown in FIG. 18, reference numeral 420 is a relief valve arranged in parallel with the swash plate angle adjusting valve 418, and reference numeral 422 is a balance adjusting valve for adjusting an operation balance of the swash plate angle adjusting valve 418 by mechanically detecting the swash plate angle.

The discharge port side of the first solenoid valve 408 is connected with the return oil path 414 to the tank 401 as described before. On the entrance port side of the first solenoid valve 408, there is provided a by-pass oil path 440 connected with the return hydraulic path 414 being capable of directly communicating with the hydraulic oil supply path 406 and the tank 410. In the by-pass oil path 440, there is provided a by-pass control valve 442 capable of by-passing the pump pressure to the tank 410. This by-pass control valve 442 is a sequence valve, which is composed in such a manner that the control valve 442 shuts off the by-pass oil path 440 until the pressure on the primary side (pump side) reaches the setting pressure and the control valve 442 is fully opened when the pressure on the primary side (pump side) has reached the setting pressure. However, in this embodiment, the setting pressure is variable. Usually, the pump discharge port pressure is introduced as the setting pressure. When it is detected that the pressure plate 304 has been excessively moved, the setting pressure is switched to the tank 410 side pressure (atmospheric pressure), so that the pump pressure can be by-passed to the tank 410. In order to by-pass the pump pressure, there is provided a pull roller type direction changeover valve 444 for mechanically detecting an excessive movement of the pressure plate 304 at an advance limit position of the pressure plate 304. Therefore, in the case where the pressure plate 304 has moved exceeding the advance limit position, the port can be changed over. Two entrance ports of this changeover valve 444 are respectively connected with the pump pressure introducing oil path 446 communicated with the hydraulic oil supply oil path 406 on the pump discharge side and also connected with the tank path 448 communicated with the return oil path 414 capable of directly connecting with the tank 410. One portion of the discharge port is connected with the setting pressure introducing oil path 450 which is communicated with the open pressure setting section of the by-pass control valve 442. Usually, the setting is conducted in such a manner that the pump discharge pressure is introduced into the open pressure setting section of the by-pass control valve 442. In the case where the pressure plate 304 is further pushed out from the mold clamping completion position, the pressure is changed over to the tank pressure. Further, there is provided a limit switch 443 for electrically detecting an excessive movement of the pressure plate 304. According to the detection conducted by this limit switch 443, the motor 402 is stopped.

Figure 19:
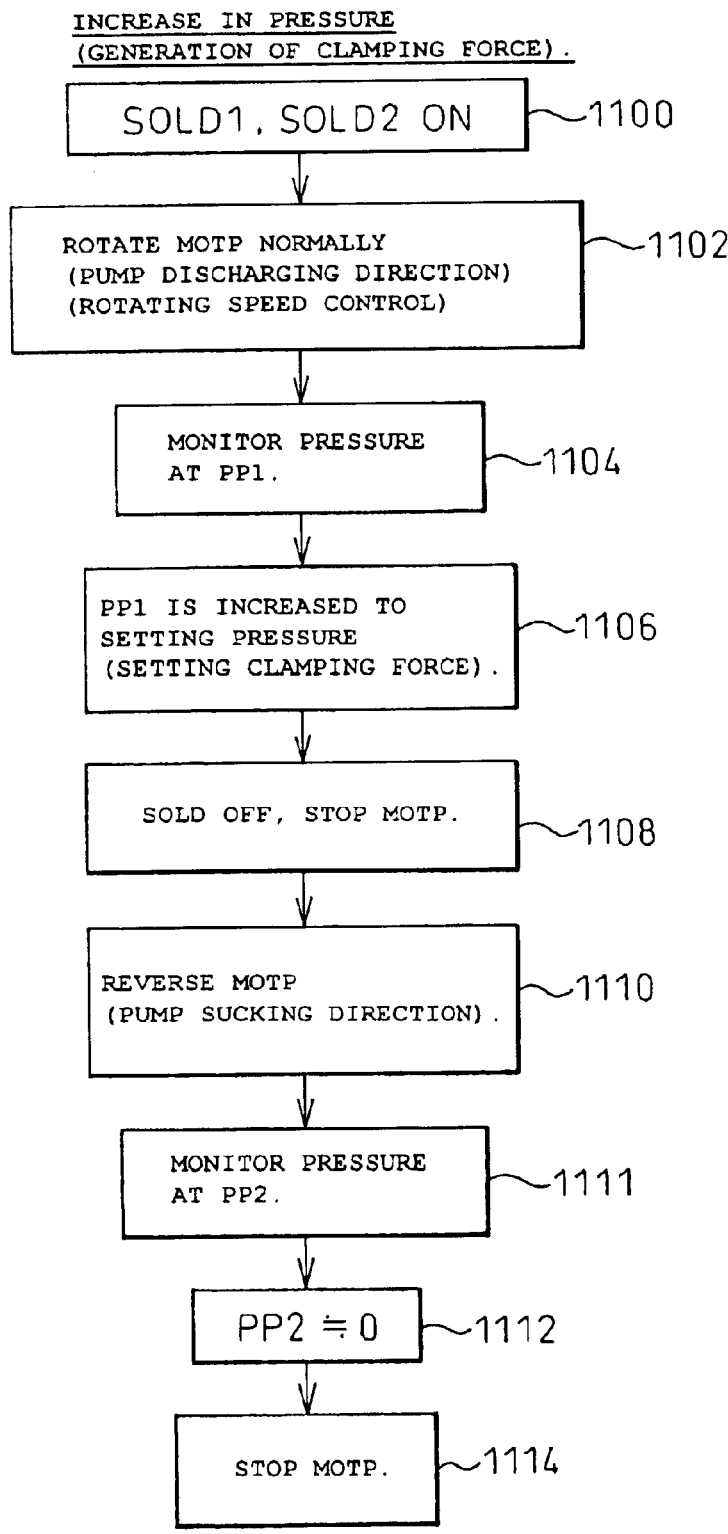
FIG. 19 is a flow chart of controlling an increase in hydraulic pressure for generating a clamping force in a pressurizing mechanism.

The hydraulic circuit 400 composed as described above generates a mold clamping force by supplying hydraulic oil to the bladder 318 by operating the control means 500 shown in FIG. 1. A control flow for raising the hydraulic pressure is shown in FIG. 19. As shown in the flow chart, when the mold clamping start conditions are ready, first, the first solenoid valve 408 (SOLD 1) and the second solenoid valve 412 (SOLD 2) are turned on (step 1100). Due to the foregoing, the hydraulic oil supply path 406 is communicated with the bladder 318. When the motor 402 is normally rotated so as to put the hydraulic pump into a discharging state (step 1102), hydraulic oil is filled in the bladder 318, and the pressure plate 304 is pushed, so that the mold clamping is started. The pressure sensor 424 (PP1) is arranged at the discharge port of the first solenoid valve 408 and monitors pressure in the bladder 318 (step 1104). The sensor 424 detects that the bladder pressure has reached a setting mold clamping pressure (step 1106). Then, the first solenoid valve 408 is turned off so as to shut off the hydraulic oil path, that is, the pressure path on the bladder 318 side is shut off, and at the same time the motor 402 is stopped so that the supply of hydraulic oil by the swash plate type pump 404 is stopped (step 1108). Due to the above operation, the mold clamping is completed, and then injection molding operation is executed. After the pressure path on the bladder 318 side has been shut off, when the motor 402 is reversed, hydraulic oil is sucked from the hydraulic oil path in the upstream (pump side) of the first solenoid valve 408 (step 1110). The pump discharge pressure is monitored by the pressure sensor 426 for detecting the pump discharge pressure arranged on the entrance side of the first solenoid valve 408 (step 1111). After it is detected that this pressure has become zero (step 1112), the motor 402 is stopped (step 1114).

Figure 20:
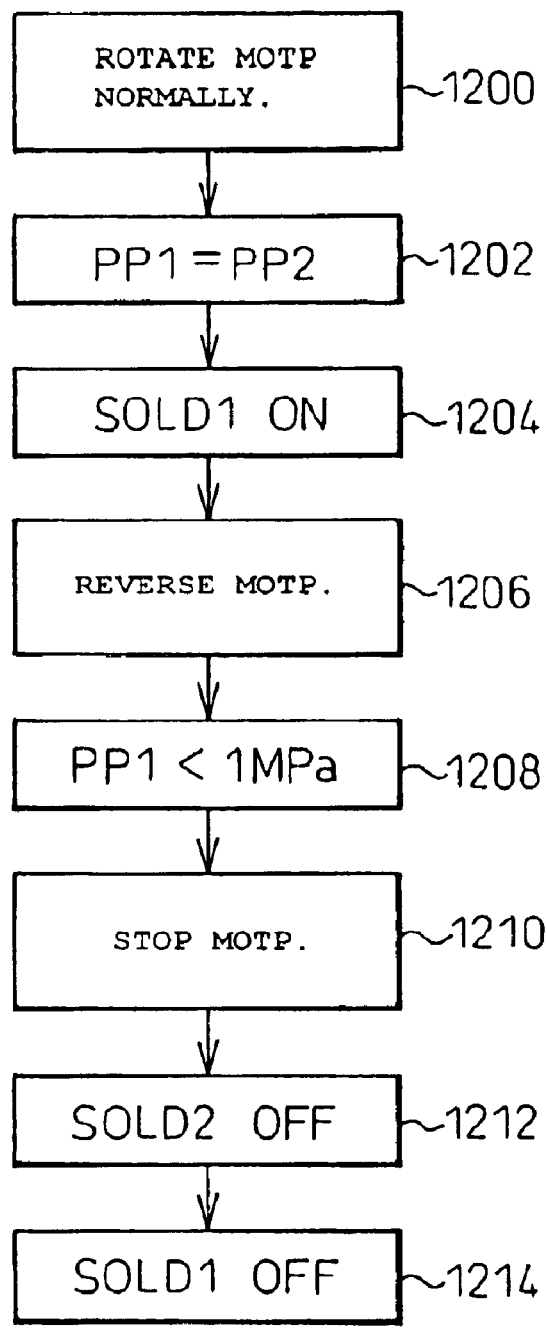
FIG. 20 is a flow chart of controlling a decrease in hydraulic pressure in a pressurizing mechanism.

After the completion of molding work, the pressure in the bladder 318 is reduced. A control flow for reducing the pressure in the bladder 318 is shown in FIG. 20. Immediately after the completion of molding work, the first solenoid valve 408 is closed and the pressure path on the bladder 318 side is shut off. In this state, the bladder pressure reducing work is started. Since the pressure before the first solenoid valve 408 is different from the pressure after the first solenoid valve 408, if the hydraulic oil path is suddenly opened and hydraulic oil is returned to the tank 410, cavitation is caused which generates vibration and increases the hydraulic oil temperature. In order to prevent the occurrence of the above problems, first, the motor 402 is normally rotated and the hydraulic pressure is increased to the pressure in the bladder 318 (step 1200). The pressure before the first solenoid valve 408 and the pressure after the first solenoid valve 408 are respectively monitored by the pressure sensors 424 (PP1) and 426 (PP2). After it is confirmed that the pressure before the first solenoid valve 408 and the pressure after the first solenoid valve 408 have become equal to each other (step 1202), the first and the second solenoid valve 408 are turned on (step 1204). Due to the foregoing, the hydraulic pressure oil supply path 406 can be communicated with the bladder 318 side. After that, the motor 402 is reversed, so that the pump can be set in a sucking state (step 1206). Due to the foregoing, hydraulic oil supplied to the bladder 318 is returned to the tank 410 via the swash plate type pump 404. Therefore, the occurrence of cavitation caused by a sudden pressure change can be suppressed, and an increase in the hydraulic oil temperature can be absorbed by the regenerative resistance of the motor 402. It is checked that the pressure on the bladder 318 side has decreased to a value at which hydraulic oil can be released to the tank 410 without causing any problem, for example, it is checked whether or not the pressure on the bladder 318 side has decreased to a value lower than the setting pressure 1 MPa (step 1208), and the motor 402 is stopped (step 1210). At the same time, the second solenoid valve 412 is turned off (step 1212). Then, the first solenoid valve 408 is turned off (step 1214), so that the bladder 318 is communicated with the tank 410, and the residual hydraulic oil is returned to the tank 410.

Figure 21:
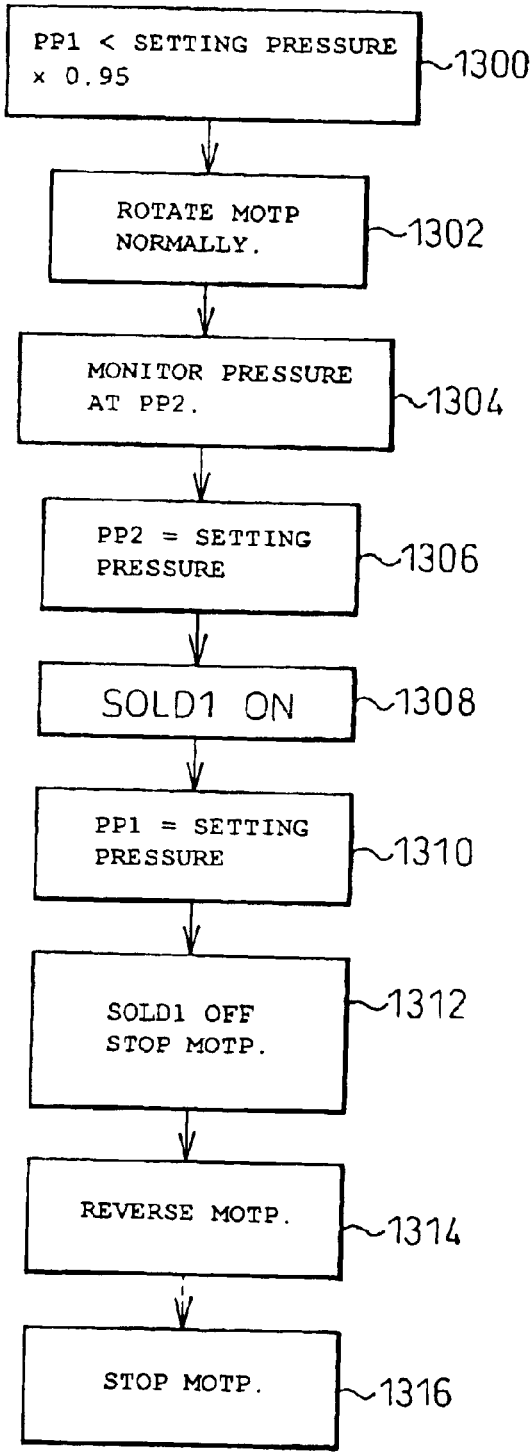
FIG. 21 is a flow chart of controlling an increase in hydraulic pressure again.

Further, in the process of mold clamping work, the problem of a burr of resin is caused when hydraulic oil leaks out from the hydraulic circuit. In order to prevent the above problem, the hydraulic pressure is increased again. This control flow is shown in FIG. 21. It is judged whether or not the detection pressure (PP1) detected by the pressure sensor 424 monitoring the pressure in the bladder 318 is decreased to lower than an allowed value of the mold clamping setting value, for example, 95% (step 1300). In the case where it is judged that the detection pressure (PP1) has been decreased lower than the allowed value, the motor 402 is normally rotated again so as to increase the hydraulic pressure (step 1302). At this time, the first solenoid valve 408 is in a closed state, and the pressure before the first solenoid valve 408 is different from the pressure after the first solenoid valve 408. Therefore, the pressure on the upstream side of the attaching position of the first solenoid valve 408 is monitored by the pressure sensor 426 (step 1304). It is confirmed that this pressure is equivalent to the pressure by which the setting mold clamping force is generated (step 1306), and the first solenoid valve 408 is opened (step 1308). While the motor is being normally rotated, a pressure increasing state of the bladder 318 is monitored by the bladder pressure monitoring pressure sensor 424 (PP1). When it is detected by the pressure sensor 424 concerned that the bladder pressure has reached the setting mold clamping pressure (step 1310), the first solenoid valve 408 is turned off so as to shut off the hydraulic oil path, and the pressure path to the bladder 318 side is shut off, and at the same time the motor 402 is stopped so that the supply of hydraulic oil by the swash plate type pump 404 is stopped (step 1312). Due to the foregoing, the hydraulic pressure is raised again. After that, the hydraulic pressure increasing work is conducted in the same manner as that of the conventional hydraulic pressure increasing work as follows. After the pressure path on the bladder 318 side has been shut off, the motor 402 is reversed. Due to the foregoing, hydraulic oil is sucked from the hydraulic path on the upstream side (pump side) of the first solenoid valve 408 (step 1314). The pump discharge port pressure is monitored at the entrance of the first solenoid valve 408. After it is detected that this pressure has become zero, the motor 402 is stopped (step 1316).

In this connection, in this embodiment, after the molding work has been completed but while the molds are being clamped as described above, the pressure in the bladder 318 is reduced. Then, the metallic molds 20, 22 are released from each other by utilizing the above swash plate type pump 404. The mold releasing work is conducted by the mold opening and closing means 100. In order to conduct the mold releasing work, the mold releasing cylinder mechanism 116 for moving the ball screw member 102 in the axial direction by a hydraulic force is provided. As schematically shown in FIG. 1, this mold releasing cylinder mechanism 116 is mounted on the stationary platen 14, and the piston rod 117 is connected with the ball screw member 102, and this ball screw member 102 is forcibly pushed out to the movable platen 18 side by a hydraulic force. When the ball screw member 102 is simply moved in the axial direction, the ball screw itself is rotated by the action of the ball nut 108. Therefore, while the transmission of rotation is being ensured by the spline mechanism so that the ball screw 102 can be moved only in the axial direction, the ball screw member 102 is attached to the stationary platen 14 side and the rotation is prevented as shown in FIG. 3.

In order to operate the mold releasing cylinder mechanism 116 described above, as shown in FIG. 18, there is provided a first branch oil path 428 for introducing the pump pressure, the first branch oil path 428 branching from the hydraulic oil supply path 406 at the discharge port of the pump in the hydraulic circuit 400, and there is provided a second branch oil path 430 branching from the returning oil path 414 communicating with the tank 410 side. These oil paths are connected with the hydraulic path 434 for proceeding, which communicates with the head side hydraulic chamber 118 of the mold releasing cylinder mechanism 116, and the hydraulic path 436 for retreating which communicates with the rod side hydraulic chamber 120 via the direction control valve 432 composed of a 4-port 3-position type changeover valve. Accordingly, when the above direction control valve 432 is changed over, the mold releasing cylinder mechanism 116 is made to conduct a mold releasing motion by utilizing discharge pressure from the swash plate type pump 404, and successively the movable platen 18 is separated from the stationary platen 14 in the mold opening operation.

Figure 22:
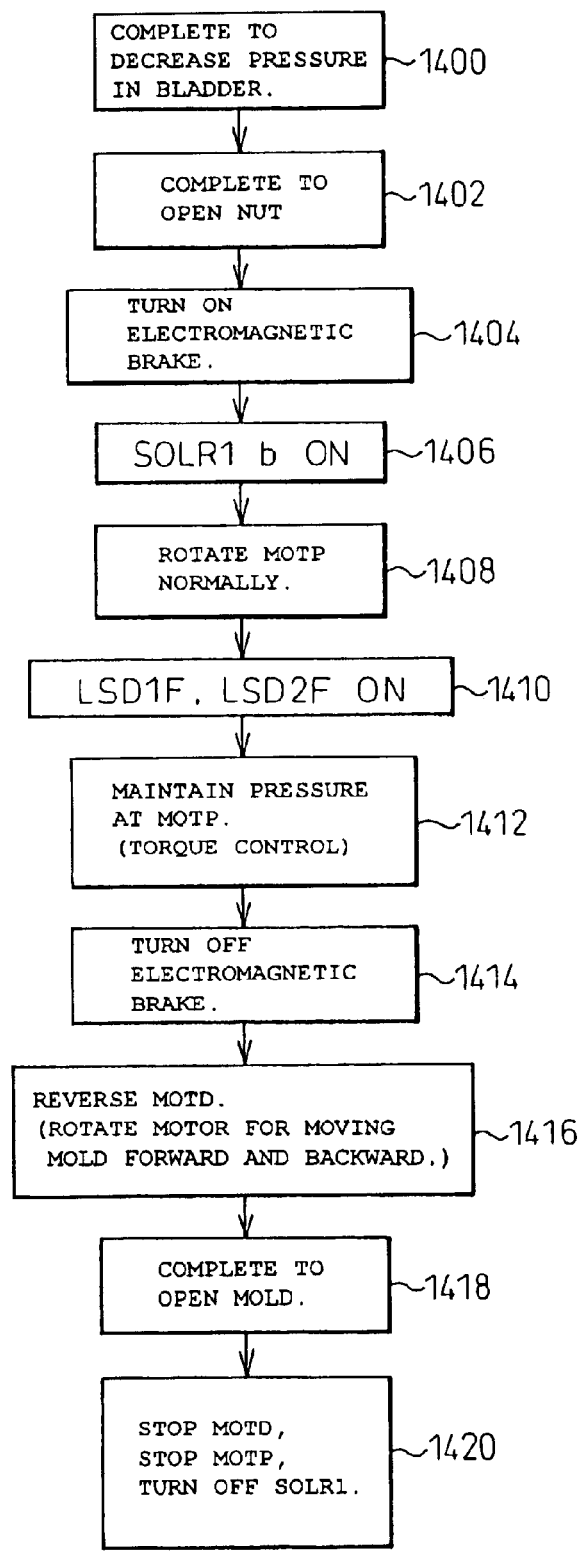
FIG. 22 is a flow chart of controlling a mold releasing operation.

FIG. 22 is a control flow chart of the mold releasing work in which the mold opening and closing means 100, composed of this ball screw mechanism, and the swash plate type pump 404 are utilized. The control means 500 operates as follows. After the injection molding work has been completed, pressure in the bladder 318 is reduced (step 1400). Then, the platen lock means 200 is operated to open the split nut 204, so that the tie rod 28 and the movable platen 18 are unlocked from each other (step 1402). Then, the electromagnetic brake means 130 attached to the ball screw member 102 of the mold opening and closing means 100 is turned on (step 1404). Due to the above operation, rotation of the ball screw member 102 is restricted, and the ball screw member 102 can be moved only in the axial direction. Therefore, the direction control valve 432 (SOLR1) arranged in the hydraulic oil path to the mold releasing cylinder mechanism 116 is operated (Solenoid "b" is turned on.), and hydraulic oil discharged from the swash plate type pump 404 is introduced into the hydraulic path 434 for proceeding via the first branch hydraulic oil path 428, and the hydraulic circuit is opened so that hydraulic oil can be introduced into the head side hydraulic chamber 118 (step 1406). After that, the motor 402 is normally driven so that hydraulic oil can be discharged and supplied (step 1408). Due to the foregoing, the mold releasing cylinder mechanism 116 pushes out the ball screw member 102 and pushes the movable platen 18 in the mold releasing direction while the ball nut 108 is being used as an engaging member. In this way, the mold releasing work can be executed. At positions to limit an advance and retreat of the piston rod 117 of each of a pair of mold releasing cylinder mechanisms 116, the position detection sensors 122, 124 are respectively arranged as shown in FIG. 18. When the position sensor 122 (LSD 1F, LSD 2F) to limit an advance of the piston rod 117, which has been pushed out by a mold releasing motion, is turned on (step 1410), the control means 500 maintains the swash plate type pump 404 so that the swash plate type pump 404 can discharge a constant hydraulic pressure (step 1412), and the piston rod 117 is prevented from being returned via the ball screw member 102. In this case, pressure can be kept constant when a quantity of leaked hydraulic oil is supplied. Therefore, the pump motor 402 is rotated a little. After that, the mold opening motion is successively started. Therefore, the electromagnetic brake means 130 is released so as to release the restriction of rotation (step 1414). Then, the servo motor 112 (MOTD) for opening and closing the molds is rotated in the direction of mold opening (in the reverse direction) (step 1416). Whether the movable platen 18 has reached a mold opening position or not is detected by the position sensor arranged in the movable region of the movable platen 18 (step 1418). Finally, the servo motor (MOTD) for opening and closing the mold and the pump motor 402 (MOTP) are stopped, and the direction control valve 432 (SOLR 1) arranged in the hydraulic oil path to the mold releasing cylinder mechanism 116 is turned off. In this way, the work is completed (step 1420).

Figure 23:
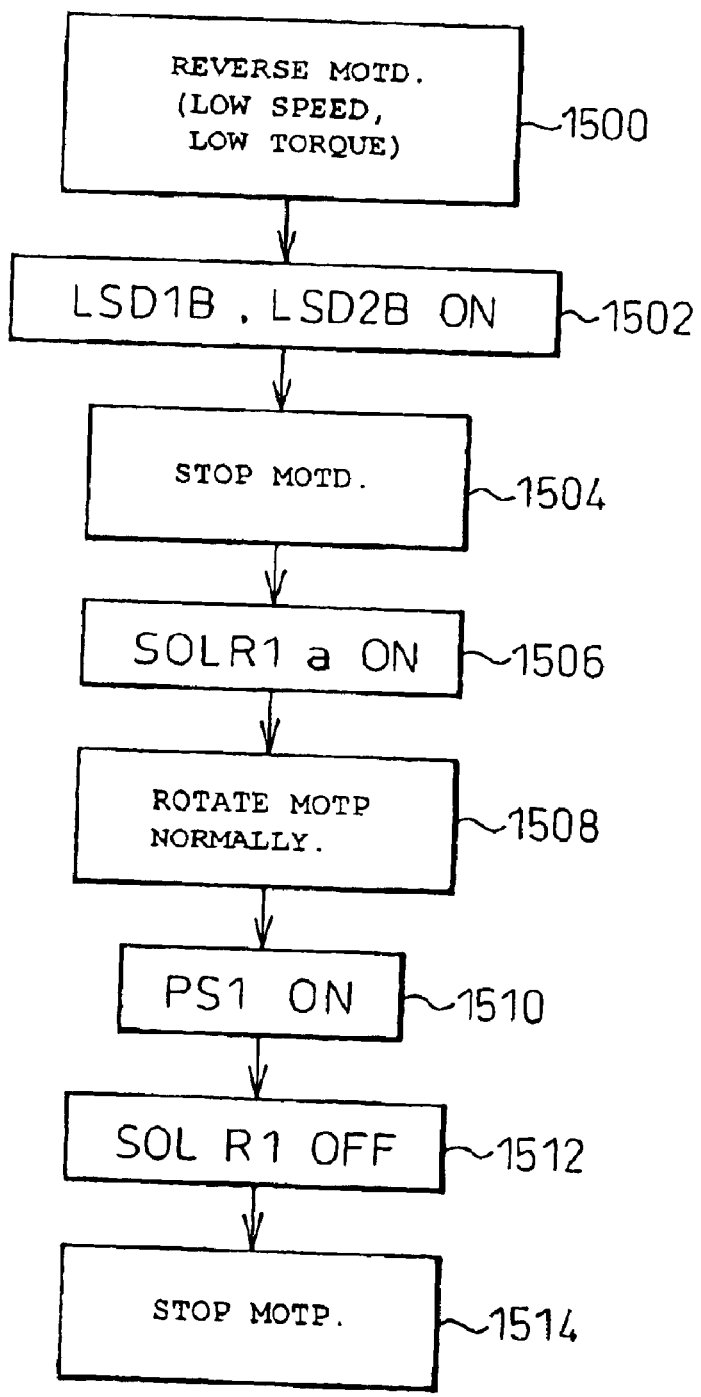
FIG. 23 is a flow chart of controlling a mold releasing cylinder to return to the origin.

By the mold releasing control motion described above, the piston rod 117 of the mold releasing cylinder mechanism 116 is located at a position to limit an advance, however, the piston rod 117 of the mold releasing cylinder mechanism 116 must be retreated for the next mold closing motion. The control flow for returning to the origin is shown in FIG. 23. This returning motion to the origin is conducted in such a manner that the piston rod 117 of the mold releasing cylinder mechanism 116 located at the position to limit an advance is retreated by utilizing the servo motor 112 for opening and closing the mold as shown in FIGS. 1 and 2. The servo motor 112 (MOTD) for opening and closing the mold is lightly rotated in the mold opening direction at a low speed and low torque so that the movable platen 18 cannot be moved (step 1500). Since the head side hydraulic chamber 118 of the mold releasing cylinder mechanism 116 is connected with the tank 410, it is possible to retreat the piston rod 117 by a low intensity force. When the sensor 124 (LSD 1B, LSD 2B) to detect the position to limit a retreat detects that the piston rod 117 has reached the position to limit a retreat (step 1502), the servo motor 112 (MOTD) for opening and closing the mold is stopped (step 1504). Then, the direction control valve 432 (SOLR 1) is operated (Solenoid "a" is turned on.) to change over the direction control valve 432 so that the pump pressure can be introduced into the rod side hydraulic chamber 120 (step 1506). Then, the swash plate type pump 404 is normally driven to supply hydraulic oil to the rod side hydraulic chamber 120 (step 1508) to increase the pressure. In the hydraulic path 436 for a retreat, there is provided a pressure switch 452 (PS1) for detecting the pressure in the rod side hydraulic chamber 120 and conducting an ON operation when the pressure has reached a setting value. After the pressure in the rod side hydraulic chamber 120 has increased to the setting value (step 1510), the direction control valve 432 (SOLR1) is turned off (step 1512), and the swash plate type pump 404 is stopped (step 1514). In the hydraulic path 436 for a retreat, there is provided a pilot check valve 454 at a position on the lower stream side of the direction control valve 432. Therefore, pressure is contained in the rod side hydraulic chamber 120. In the case of opening and closing the mold, a movement of the ball screw member 102 in the axial direction is strongly restricted, and the movable platen 18 can be smoothly moved for clamping the mold.

The mold clamping device 10 composed as described above is operated as follows.

First, the mold opening and closing means 100, which is in a mold opening state, is operated. When the ball screw member 102 is rotated by driving the servo motor 112 for driving, the ball nut 108 attached to the movable platen 18 side is moved while being screwed, and the movable platen 18 is moved to the stationary platen 14 side. At the point of time when the movable metallic mold 22 comes into contact with the stationary metallic mold 20, the servo motor 112 is stopped. In this way, the molds can be put into a closed state. Successively, the platen lock means 200 is operated as follows. A pair of split nuts 204, which are open in the case of opening and closing the mold, are closed when they are moved in the radial direction of the tie rod 28 by the drive of the nut cylinder 222, and the engaging teeth formed on the inner circumferences of the split nuts 204 are engaged with the ring grooves 202 formed on an outer circumferential face of the tie rod 28. In this way, the movable platen 18 and the tie rod 28 can be engaged with each other.

After the completion of accomplishing the mold closing state, the pressurizing mechanism 300 is operated by utilizing the hydraulic circuit 400 and control means 500. First, the swash plate type pump 404 and the first and the second solenoid valve 408, 412 are turned on so as to accomplish a communicating state, that is, the hydraulic oil path is communicated so that hydraulic oil can be supplied to the bladder 318. Then, the motor 402 is normally rotated so that the pump is put into a discharging state, and hydraulic oil is supplied to the bladder 318. When hydraulic oil is charged into the bladder 318, which is tightly contacted with the insert die 320 arranged inside, via the hydraulic oil path 322, since a portion of the bladder 318 except for the piston contact portion 326 is regulated by the wall face surrounding the bladder 318, the bladder 318 is expanded onto the piston 316 side, so that the piston 316 is pushed out and the pressure plate 304 is pushed and the mold clamping is started. When the pressure sensor 424 detects that the bladder pressure has reached a setting mold clamping pressure, the pressure path on the bladder 318 side is shut off, and the motor 402 is stopped so that the supply of hydraulic oil by the swash plate type pump 404 is stopped. Due to the foregoing, the mold clamping operation is completed, and then injection molding is conducted.

On the other hand, in the case of opening the mold, first, the pressure in the bladder 318 is decreased. Therefore, the pressure of hydraulic oil contained in the bladder 318 is gradually decreased, so that the clamping force can be reduced. In a state in which the pressure path on the bladder 318 side is shut off so as to contain the pressure, the motor 402 is normally rotated until the pressure is increased to an enclosing pressure, so that the pressure in the hydraulic oil path from the swash plate type pump 404 to the first solenoid valve 408 is increased. After that, the first solenoid valve 408 is opened. Then, the motor 402 is reversed so as to return hydraulic oil charged in the bladder 318 to the tank 410 by the swash plate type pump 404. Due to the foregoing, the pressure of the enclosed hydraulic oil is gradually reduced and the occurrence of cavitation caused by a sudden pressure change is suppressed, and a rise of hydraulic oil temperature is absorbed by a regenerative resistance of the motor 402. When the pressure on the bladder 318 side has decreased to a value at which no problems are caused even if the hydraulic oil path is open to the tank 402, the motor 402 is stopped. Then, the first and the second solenoid valve 408, 412 are changed over, so that the bladder 318 is communicated with the tank 410, and the residual hydraulic oil is returned to the tank 410. Then, the pressure plate 304 is drawn back to the platen body 302 side by a restoration force of the coned disc spring 310, and a positional relation between the pressure pate 304 and the piston 316 is automatically returned to a positional relation before the mold clamping force is activated.

The metallic molds 20 and 22, which have been released from the mold clamping state, are connected with each other. In order to releasing the metallic molds 20 and 22, the ball screw member 102 of the mold opening and closing means 100 is used. After the movable platen 18 and the tie rod 28 have been disconnected from each other by releasing the split nut 204, hydraulic oil discharged from the swash plate type pump 404 is introduced into the mold releasing cylinder mechanism 116 which is attached so that the ball screw member 102 can be moved in the axial direction. While rotation of the ball screw member 102 is being prevented, it is forcibly pushed out to the movable platen 18 side by hydraulic pressure. Due to the foregoing, mold releasing is conducted. When the servo motor 112 is reversed, the movable platen 18 is moved to a position at which the mold opening motion is limited, and then the ball screw member 102 is returned to the original position.

In the mold clamping device of the above embodiment, the screw member 102 of the electrically driven ball screw mechanism is movably supported so that it can be moved in the axial direction, and the mold releasing cylinder mechanism 116 is provided which generates a mold releasing force by giving a force in the axial direction to the ball screw member 102, and the brake means 130 is arranged in the ball screw member 102, so that the rotation is restricted in the case of mold releasing operation to release the mold. Therefore, when both the electrically driving operation and the hydraulic operation are effectively used, energy can be saved by this mold clamping device. As hydraulic oil of the mold clamping hydraulic circuit 400 is supplied to the mold releasing cylinder mechanism 116 and especially torque is controlled by using the variable delivery piston pump, it is possible to use the mold releasing cylinder mechanism 116 for both mold clamping and mold releasing while the device is miniaturized. The pilot check valve 454 is provided as a hydraulic pressure enclosing means in the hydraulic oil path to the mold releasing cylinder mechanism 116. Therefore, the ball screw member 102 can be held at the origin returning position, and the movable platen 18 is not vibrated in the case of a mold opening and closing operation.

When only the pressure of hydraulic oil enclosed in the bladder 318 is controlled, the mold clamping force can be controlled. Therefore, it is possible to control a mold clamping force with high accuracy by utilizing the hydraulic control technique. Further, the pressurizing mechanism is so simple that the cylinder 312 is formed on the stationary platen 14 side of the mold clamping device 10 and the bladder 318 is accommodated in it. Therefore, the molding work can be carried out without a failure, and the durability of the device is high.

In addition to that, the stationary platen 14 is composed of the platen body 302 and the pressure plate 304. Between them, the piston 316 is arranged which is pushed out by the expanding and contracting action of the bladder 318 when hydraulic pressure is introduced into the bladder 318 composed of a tightly closed bag. When the piston 316 is pushed out, the mold clamping is carried out. Further, the insert die 320, the shape of which is identical with the internal shape of the bladder 318, is housed inside the bladder 318. When pressure is not given, the insert die 320 and the bladder 318 come into tight contact with each other, and the opening of the hydraulic oil path 322 formed in the insert die 320 is closed by the bladder 318. As a result, it is possible to greatly reduce a quantity of hydraulic oil. It is unnecessary to provide a quantity of hydraulic oil required for filling a volume of the bladder 318, that is, it is sufficient to provide a quantity of hydraulic oil corresponding to an expanded volume for clamping the mold.

In this pressurizing mechanism 300, it possible to effectively prevent air from remaining inside the bladder 318 when hydraulic oil is supplied in the case of clamping the mold. That is, when hydraulic oil is supplied from the hydraulic circuit 400 before clamping the mold, it is introduced from the supply hydraulic oil path 354 located under the pressurizing mechanism 300. Then, while the hydraulic oil is flowing in the annular hydraulic oil path 352, it is charged into a plurality of hydraulic oil paths 322 which are communicated with the annular hydraulic oil path 352. Therefore, it is possible to completely bleed air, which exists in the hydraulic oil paths, through the air bleeding path 356 formed in an upper portion of the clamping mechanism 300. Since the opening on the bladder 318 side of the hydraulic oil path 322 formed in the insert die 320 is closed by the bladder 318, even if an expansion space of the bladder 318 can be formed in an upper portion of the opening of the hydraulic oil path 322, no air remains in this portion when hydraulic oil is supplied at the initial stage. When the air bleeding path 356 is closed in the above state, no bubbles stay in the mold clamping hydraulic path. Therefore, the mold clamping action can be accurately conducted with a quick response. Accordingly, when the bladder 318 is used as a tightly closed bag, while the leakage of hydraulic oil to the peripheries of the metallic molds 20, 22 is being prevented, it is possible to completely prevent the occurrence of a problem that the mold clamping force is not appropriately given to the metallic mold because air remains in the hydraulic oil paths. In this connection, a diameter of the supply hydraulic oil path 338 concentrically formed on the cylinder block 314 side directly communicated with the hydraulic oil path 322 formed in the insert die 320 in this embodiment may be larger than the diameter of the hydraulic oil path 322 on the insert die 320 side so that air can be smoothly bled.

In this embodiment, the protrusions 344 are integrally formed in the ear piece portions 332 of the bladder 318 and engaged with the engaging grooves 346, 348 formed in the cylinder block 314 so as to be fastened and fixed. Due to the above structure, even when a high hydraulic pressure is given to the bladder 318 so that the bladder 318 is expanded, it is possible to prevent the bladder 318 from being disconnected from the insert die 320. Therefore, the leakage of hydraulic oil can be prevented. The ear piece portions 322 of the bladder are fastened by the fastening bolts 342 so that the thickness can be smaller than the wall thickness of the ear piece portions 322 of the bladder and the ear piece portions 322 can be contacted with pressure. Therefore, the sealing function in the fastening portion can be accomplished by the bladder 318 itself, and it is unnecessary to provide an independent hydraulic seal.

In the piston 316 pushed against the bladder 318, the cutout step portions 358, 360 are formed in the opposing portion of the piston 316 which is opposed to the corner portion of the bladder 318. The piston rings 362, 364 made of soft material such as fiber material are attached to these cutout step portions 358, 360. When the bladder corner portion is received by the piston rings 362, 364 made of flexible fiber woven material, it becomes possible to greatly reduce deterioration and damage of the bladder 318, and the durability of the bladder 318 can be enhanced.

Further, on the piston sliding face in the cylinder 312, a hydraulic oil leakage inspecting oil path 366 is arranged so that the leakage of hydraulic oil can be detected. Therefore, it becomes possible to detect damage to the bladder 318. Accordingly, it is possible to take countermeasures before hydraulic oil leaks from the pressurizing mechanism 300. Due to the foregoing, the mold clamping device 10 can be made very safe.

In this embodiment, hydraulic oil is supplied to the bladder 318, which can be expanded and contracted, by the reversible motor 402 and the swash plate type pump 404 which is driven by the reversible motor 402, the torque of which is controlled to be constant. Therefore, while an output of the motor is being reduced, a high intensity mold clamping force can be generated. After the mold clamping force has been generated, the motor 402 is reversed and then stopped. Therefore, unnecessary hydraulic oil can be returned to the tank, and the heat of the hydraulic oil, the temperature of which has been raised by the pressurizing action, can be absorbed by a regenerative resistance of the motor 402.

According to a signal to start a decrease in pressure after the completion of injection molding, the control means 500 operates as follows. While the first solenoid valve 408 is previously closed, the swash plate type pump 404 is normally rotated so as to supply hydraulic oil. After pressure has been adjusted so that the pressure before the contained position and that after the contained position are equivalent to each other, the first solenoid valve 408 is opened and the swash plate type pump 404 is reversed, and hydraulic oil is returned to the tank 410 side via the swash plate type pump 404. Accordingly, in the case of decreasing pressure, pressure of hydraulic oil is gradually decreased, so that the occurrence of cavitation caused by a sudden pressure change can be suppressed and an increase in the temperature of hydraulic oil can be suppressed when generated heat is absorbed by the regenerative resistance of the motor 402.

Since the bladder 318 is used in the pressurizing mechanism 300, it is necessary to safely protect the bladder 318 from damage. When the bladder 318 is reversely compressed by the injection pressure, the internal pressure of the bladder 318 is abnormally raised. In this case, the relief valve 416 arranged in parallel with the second solenoid valve 412, which is always open and arranged in the return oil path 414, is operated, and an open flow path to the tank 410 is formed so that pressure can be released. When pressure is abnormally raised on the pump 404 side or when the pressure plate 304 is excessively moved, the bladder 318 is damaged. In this case, the by-pass control valve 442 arranged in the by-pass oil path 440 provided on the delivery side of the pump is quickly opened. Therefore, it possible to prevent the scatter of hydraulic oil caused when the bladder 318 is damaged.

Next, referring to the drawings, another embodiment of the pressurizing mechanism of the clamping device of the present invention will be explained in detail as follows.

Figure 28:
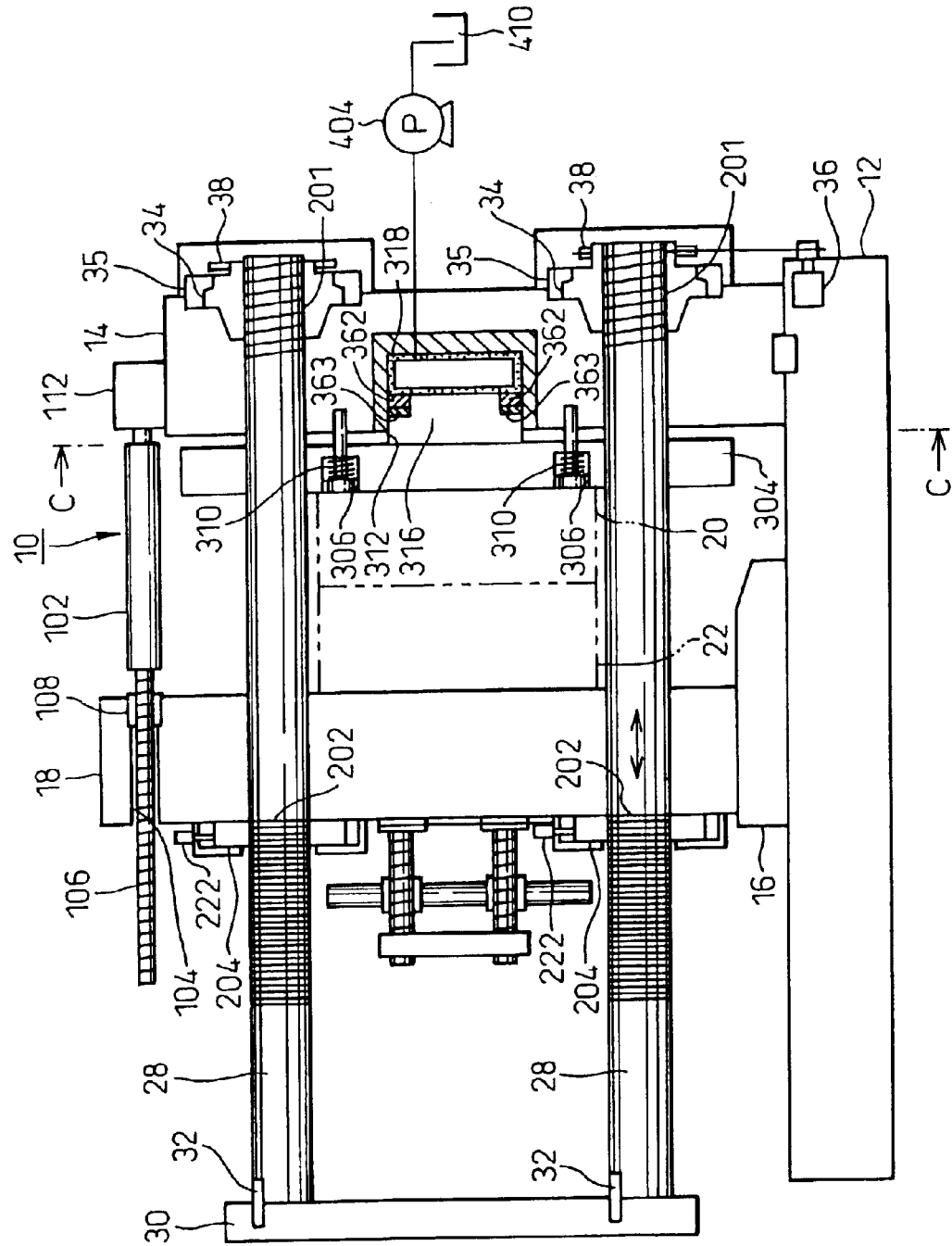
FIG. 28 is an overall arrangement view of a clamping device of another embodiment of the present invention.

As shown in FIG. 28, the stationary platen 14 is vertically arranged on one end of the machine base 12 while the base portion of the stationary platen 14 is fixed by means of a key. On the other hand, the movable platen 18, which is capable of proceeding and retreating with respect to the stationary platen 14, is vertically arranged being opposed to the stationary platen 14. The ball nut 108 is arranged at a step portion in the through-hole 104 formed at a corner of the vertical plane of the movable platen 18. An axial end of the ball screw member 102 having the screw portion 106 screwed with the ball nut 108 is concentrically connected with an output shaft of the servo motor 112, which is arranged on an upper face of the stationary platen 14, for opening and closing the mold. When the servo motor 112 is controlled so that it can be rotated normally or reversely, the movable platen 18 proceeds to or retreats from the stationary platen 14 being integrated with the guide shoe 16. Accordingly, the movable metallic mold 22 attached to the movable platen 18 can be opened and closed with respect to the stationary metallic mold 20.

One end of the tie rod 28, which penetrates the stationary platen 14, movable platen 18 and pressure plate 304 used as a metallic mold attaching plate to which the stationary platen 14 is attached, is connected with the end plate 30 at a predetermined interval and fixed by the lock piece 32 so that the tie rod 28 cannot be rotated. The screw portion 201 at the other end of the tie rod 28 is screwed with the tie rod nut 34.

The tie rod nut 34 includes the tie rod nut rotary member 38 rotated by the servo motor 36 via a belt. Further, the tie rod nut presser metallic piece 35, which is arranged in a step portion of the tie rod nut 34, is fixed to the stationary platen 14 by bolts. In this way, a space can be ensured in which the tie rod nut 34 surrounded by the tie rod nut presser metallic piece 35 and the stationary platen 14 can be rotated.

On an outer circumferential face in the middle of the tie rod 28, there are provided a plurality of ring grooves 202. On the other hand, on an inner circumferential face of the split nut 204 arranged on an end face of the movable platen 18 which is opposite to the side on which the metallic mold is attached, there is provided an internal circumferential protrusion capable of engaging with an appropriate portion of the ring grooves 202.

As described above, while the movable platen 18 and the movable metallic mold 22 are being moved so that they can be opened and closed, the split nut 204 is held in a state in which it is split to halves. However, when the stationary metallic mold 20 and the movable metallic mold 22 are closed and then the split nut 204 is closed by operating the air cylinder 222, the inner circumferential protrusion of the split nut 204 is engaged in the ring groove 202, so that the movable platen 18 and the tie rod 28 can be engaged with each other.

As described above, in order to maintain the engaging state of the movable platen 18 with the tie rod 28, when the stationary metallic mold 20 and the movable metallic mold 22 are closed to each other, a position of each ring groove 202 must agree with an appropriate position at which the ring groove 202 engages with the inner circumferential protrusion of the split nut 204. Accordingly, in the case where the metallic molds are replaced, it is necessary to conduct a die-height adjustment in which the tie rod 28 is moved in the axial direction according to the metallic mold thickness (die-height) before the molding operation is started so that the ring groove 202 can be engaged with the inner circumferential protrusion of the split nut 204.

In the mold clamping device 10 shown in FIG. 28, when four tie rod rotary members 38 are rotated being linked with each other in the case of adjusting the die-height, the four tie rods 28 are moved in the axial direction with respect to the stationary platen 14, and the length of each screw portion 201 protruding outside the stationary platen 14 is changed. In FIG. 28, a bold arrow represents a motion of the tie rod in the case of adjusting the die-height. As shown by the bold arrow, when the tie rod nut 34 is rotated, the tie rod 28 itself is not rotated but is moved in the axial direction by the distance corresponding to an adjustment of the die-height.

Next, explanations will be made into a mechanism by which a mold clamping force is given to the stationary metallic mold 20 and the movable metallic mold 22 which have been closed to each other.

At the center of the vertical face of the stationary platen 14 on the side opposite to the tie rod nut 34 side, there is provided a cylinder 312, the shape of which is a recess having a bottom portion. On the bottom side of the cylinder 312, there is provided a bladder 318 made of flexible material, having a hollow hydraulic chamber inside. Further, on the opening side of the cylinder 312, there is slidably provided a piston 316, the forward end of which is a pushing face. The bladder 318 is enclosed in a space formed by the cylinder 312 and the piston 316 without leaving any gap.

In the above piston 316, an end face of the piston 316 on the side opposite to the side facing the bladder 318 is connected with the pressure plate 304. The tie rods 28 penetrate the tie rod holes formed at four corners of the pressure plate 304, and the stationary metallic mold 20 is attached at the center of the vertical face of the pressure plate 304 on the side opposite to the side on which the piston 316 is arranged. Further, in the large diameter portion of each of a plurality of through-holes 306 having a step portion which is formed on the pressure plate 304 from the side on which the metallic mold is attached, there is provided a coned disc spring 310. The bolt 308 connecting with the pressure plate 304 via the coned disc spring 310 penetrates the small diameter portion of the through-hole 306 and screws with the stationary platen 14.

In this case, as shown in FIG. 28, hydraulic oil can be filled into the bladder 318 from the oil tank 410 by the pump 404. A force to push the back face of the piston 316 generated by the bladder 318 expanded by the internal pressure is transmitted to the pressure plate 304 as a mold clamping force.

On the other hand, when hydraulic oil enclosed in the bladder 318 is returned to the oil tank 410 side via an appropriate changeover valve (not shown) so as to reduce the pressure in the bladder 318, positions of the stationary metallic mold 20, pressure plate 304 and piston 316 can be automatically returned by a restoration force of the cone disc spring 310 to the initial positions before the mold clamping force was given.

When pressure of hydraulic oil enclosed in the bladder 318 accommodated in the cylinder 312 formed on the stationary platen 14 of the mold clamping device 10 such as an injection molding machine or die-casting machine is controlled as described above, a mold clamping force given between the stationary metallic mold 20, which is interposed between the pressure plate 304 and the movable platen 18, and the movable metallic mold 22 can be controlled in the mold clamping mechanism. In cooperation with the aforementioned ball screw drive type mold opening and closing mechanism, it is possible to provide a clean mold clamping device characterized in that: the energy saving property is high; the control accuracy is excellent; the structure is simple; and the durability is high.

Next, the pressurizing mechanism of the mold clamping device of the present invention will be explained referring to FIGS. 24 and 28. As shown in FIG. 28, the square pressure plate 304, the rod holes at the four corners of which are slidably engaged with the tie rods 28, is put on the vertical plane of the stationary platen 14, being capable of coming into contact with and separating from the stationary platen 14. The cylinder portion 312 is provided on a face of the stationary platen 14 opposed to the pressure plate 304. This cylinder 312 is open to the pressure plate 304. In this cylinder portion 312, there are provided a bottom plate 311, cylinder 313, bladder 318 and piston 316. In this cylinder portion 312, there is provided a hydraulic pressure introducing port 315 penetrating the bottom plate 311. In this way, the pressurizing mechanism 300 of the mold clamping device is composed.

As shown in FIG. 24, the pressurizing mechanism 300 of this mold clamping device includes: a circular cylinder 313 attached to the cylinder portion 312 by being fixed by bolts; and a piston 316 slidably engaged in an internal hole of the cylinder 313. A lower portion of this piston 316 is capable of sufficiently coming into contact with the bladder 318 arranged in a lower portion when the bladder 318 is expanded. Hydraulic oil is introduced into the bladder 318 via the hydraulic pressure introducing port 315 formed on the bottom plate 311 of the cylinder 313. Pushing force F generated by hydraulic oil in the bladder 318 is smoothly transmitted to the piston 316, and a mold clamping force can be given to between the stationary platen 14 and the movable platen 18.

It is preferable that the bladder 318 used for this embodiment is made of a flexible oil proof rubber such as nitrile rubber, acrylic rubber, silicon rubber and fluororubber. Although the thickness of the bladder 318 depends upon the diameter of the piston 316, it is preferable that the thickness is determined to be 2 to 5 mm. In this embodiment, the compact bladder 318 is arranged coming into contact with the stationary platen 14, and hydraulic oil is enclosed in the bladder 318. Therefore, it is possible to give a mold clamping force to the stationary metallic mold 20 via the pressure plate 304.

Especially when hydraulic oil is supplied to and discharged from the inside of the bladder 318, as shown in FIGS. 33A and 33B, in the case of the tightly closed bag 6 of the prior art, a portion of the corner of the tightly closed bag 6 intrudes into a gap between the platen 2 and the ram 5 due to the expanding and contracting motion of the tightly closed bag 6. In the above phenomenon, this portion of the tightly closed bag 6, which has intruded into the gap between the platen 2 and the ram 5, gradually becomes fragile when the bag is expanded and contracted. Accordingly, there is a possibility that the tightly closed bag 6 is damaged in the process of operation of an injection molding or die-casting machine.

Figure 26A:
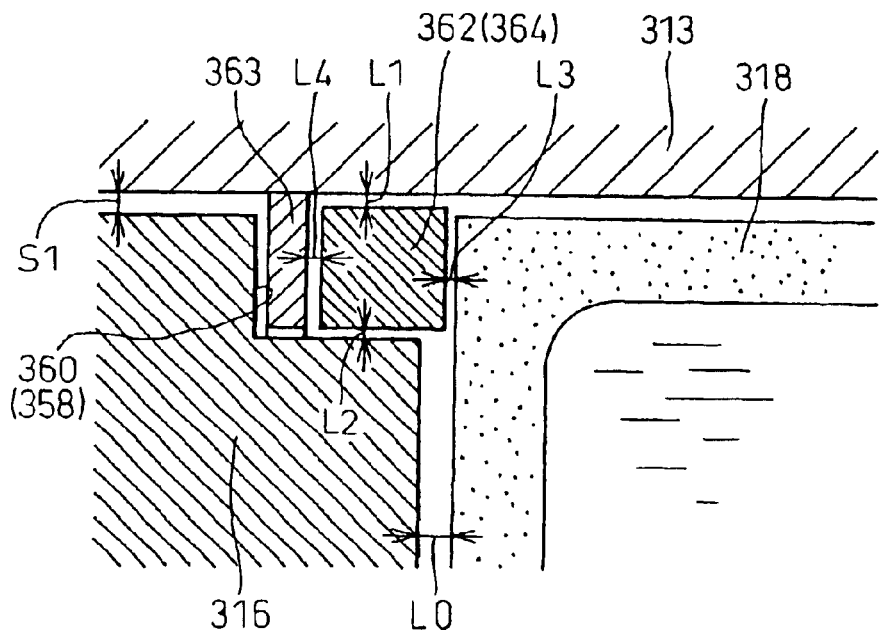
Figure 26B:
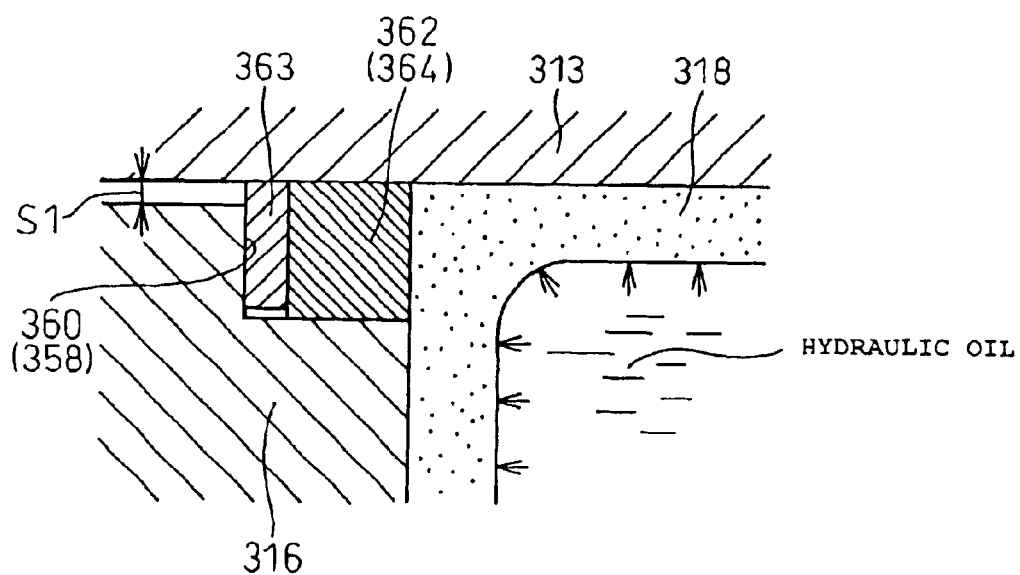

In order to solve the above problems, according to the present invention, the following countermeasures are taken as shown in FIGS. 26A and 26B. In order to prevent the corner of the bladder 318 from intruding into the gap between the cylinder 313 and the piston 316, the cutout step portions 358, 360, the cross sections of which are formed into an L-shape, are formed in the outer circumferential portion of the piston 316 on the bladder 318 side, and the piston rings 362, 364 and the backup ring 363, which are protective material members, are inserted and arranged being put on each other.

In this embodiment, concerning the piston rings 362, 364, for example, a ring-shaped member, into which tetrafluoroethylene fibers are woven, is arranged adjacent to the bladder 318. When the piston rings 362, 364 composed as described above are used, before hydraulic pressure is introduced into the bladder 318 as shown in FIG. 26A, since the bladder 318 is not expanded, clearances L0, L1, L2, L3 and L4 are maintained between the piston rings 362, 364 and the piston 316 or between the piston rings 362, 364 and the bladder 318.

Further, as shown in FIG. 26B, when hydraulic pressure is introduced into the bladder 318, the bladder 318 is expanded and pushes the piston rings 362, 364. Therefore, clearance L0 between the piston 316 and the bladder 318 becomes zero, and clearances L1, L2, L3 and L4, which are the upper and lower side clearances and the right and left clearances, also becomes zero. When the ring-shaped member, into which Teflon (polytetrafluoroethylene) fibers are woven as described above, is used, the above clearances are filled with the ring-shaped member when the bladder 318 is expanded. Therefore, it becomes possible to prevent the occurrence of such a phenomenon that a portion of the bladder 318 is inserted into the clearance by the expansion of the bladder 318 and the bladder 318 is finally damaged. Since the piston rings 362, 364 are soft, the bladder 318 made of rubber is seldom damaged.

Figure 27:
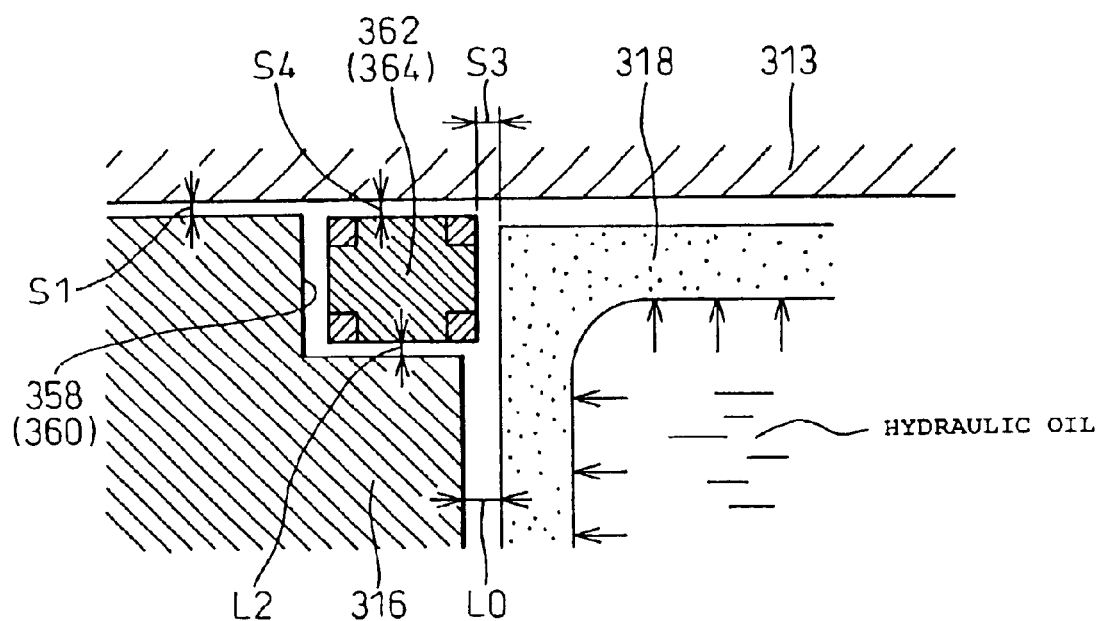
FIG. 27 is a schematic illustration showing a protective state of a bladder by a seal member similar to that shown in FIGS. 26A and 26B.
Figure 29:
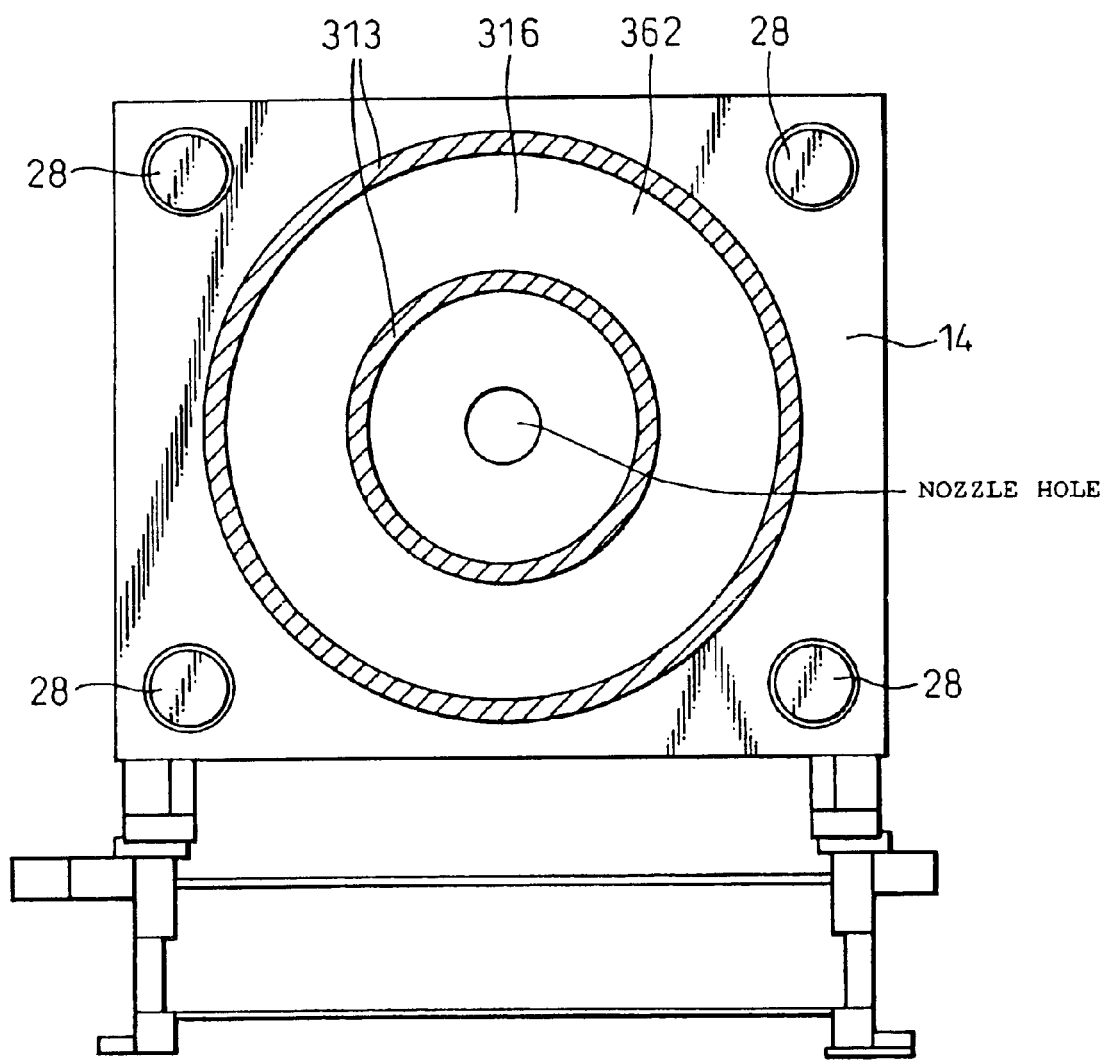
FIG. 29 is a front view showing a ring-shaped bladder, wherein the view is taken on line C—C in FIG. 28.
Figure 30:
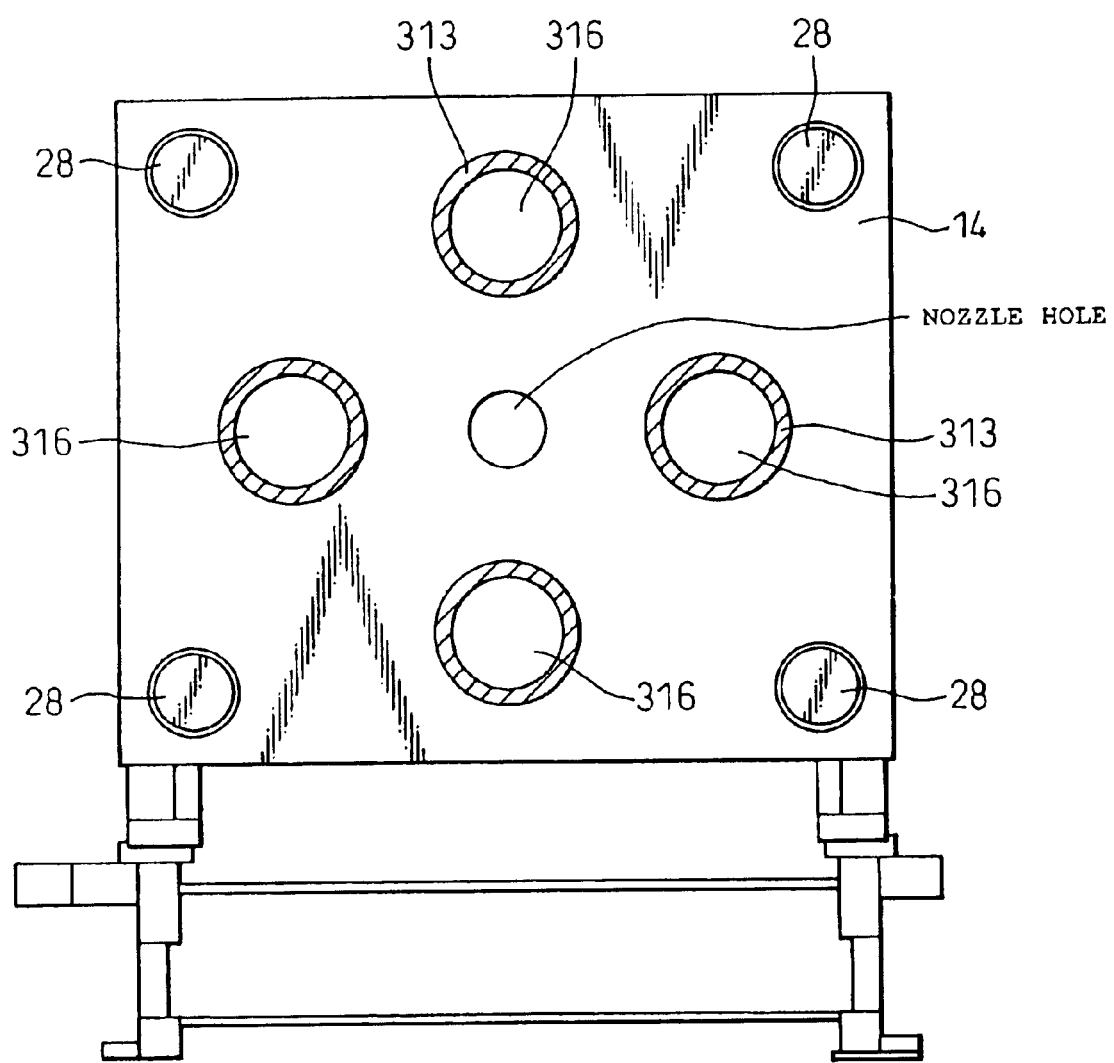
FIG. 30 is a front view showing a state in which a plurality of circular bladders of another embodiment are attached, wherein this view is taken on line C—C in FIG. 28.
Figure 31:
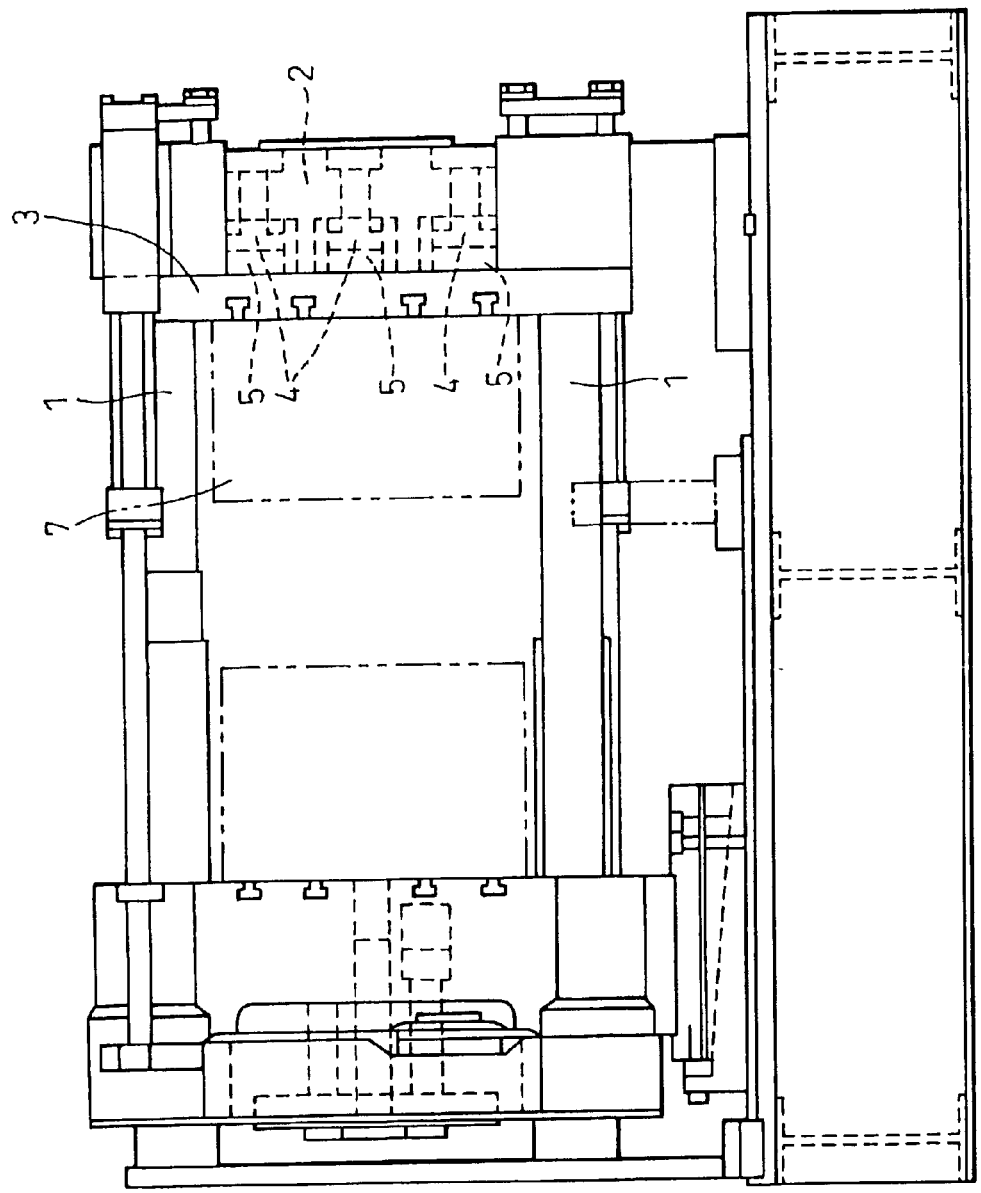
FIG. 31 is an overall arrangement view of a clamping device in which a tightly closed bladder is incorporated into a conventional stationary platen.
Figure 32:
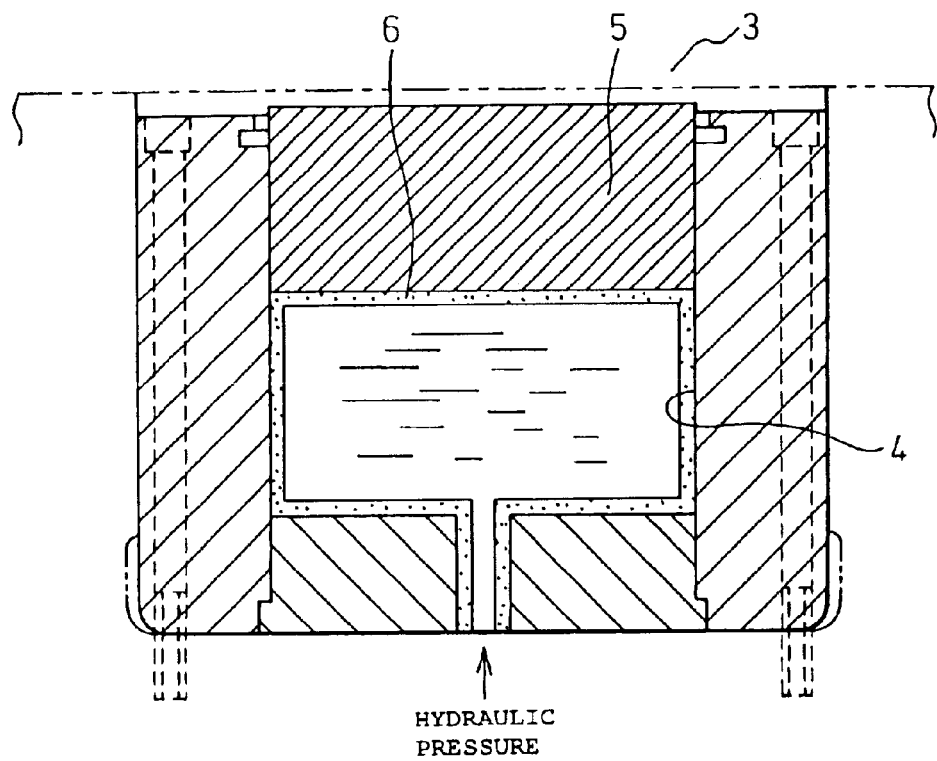
FIG. 32 is a sectional view of a pressurizing mechanism of a conventional clamping device.

As shown in FIG. 27, when the piston ring 362 having the reinforcing portions 362a at four corners or one corner is used as a protective material member, collapse of the profile of the piston ring 362 can be prevented. Therefore, the closeness of clearances L1 to L4 can be enhanced. At the same time, it becomes possible to prevent the corner of the piston ring 362 from intruding into gap S1 between the cylinder 313 and the piston 316. Therefore, it possible to protect the piston ring 362 from damage and, further, it possible for the piston 316 to be smoothly reciprocated. Furthermore, it is possible to omit to arrange the backup ring 363, which results in the reduction of the manufacturing cost. In this connection, in this embodiment, the shape of the bladder 318 is not restricted to the specific embodiment. It is possible to adopt the ring shape shown in FIG. 29. Further, it is possible to attach a plurality of circular bladders shown in FIG. 30.

As explained above, according to the present invention, the pressurizing mechanism is composed in such a manner that when a bladder, into which hydraulic oil can be introduced, arranged in a cylinder, is expanded and contracted, a piston can be pushed out. An insert die, the shape of which is identical with that of the internal shape of the bladder, is housed in the bladder. A hydraulic path is formed in the insert die. A ball screw member of the electrically driven ball screw mechanism is supported being capable of moving in the axial direction. A break means for restricting rotation is provided in the ball screw member. A mold releasing cylinder mechanism for generating a mold releasing force in the axial direction is connected with it. A hydraulic pressure supply source is used in common between this mold releasing cylinder mechanism and the aforementioned bladder, and when a hydraulic oil path is changed over, the mold releasing cylinder mechanism can be operated. Therefore, it is composed in such a manner that hydraulic oil is supplied to the bladder in which the insert die is housed. Accordingly, a quantity of oil to be supplied for clamping the mold can be minimized. When the molds are once clamped, the drive of the hydraulic source can be stopped. Therefore, while energy saving is being sufficiently realized, it is possible to exhibit a high intensity of clamping force by a compact device. In the case of releasing the molds, it is unnecessary to activate hydraulic pressure given to the mold clamping pressurizing mechanism. A mold releasing operation is conducted by the mold releasing cylinder arranged in the electrically driven ball screw mechanism used for opening and closing the molds. In this case, the hydraulic pressure supply source used for clamping the molds is used in common. Therefore, the apparatus can be simplified.

According to the present invention, a recessed space is provided in the neighborhood of the outer circumference of the piston, and the seal member composed of the soft piston ring and the hard backup ring is inserted into this space. Accordingly, when the bladder is expanded and contracted in the cases of supplying and discharging hydraulic oil, there is no possibility that the bladder is inserted into the gap. Therefore, the durability of the bladder is greatly enhanced, and the reliability of the device can be greatly improved.

In this connection, a specific embodiment of the present invention is explained in detail here. However, variations may be made by one skilled in the art without departing from the spirit and scope of the present invention.

What is claimed is:

1. A clamping device comprising:
   a movable platen having a movable metallic mold, capable of going forward and back;
   a stationary platen having a stationary metallic mold, arranged being opposed to the movable platen; and
   an opening and closing operation mechanism for opening and closing the movable and the stationary platen respectively having the movable and the stationary metallic mold, the movable and the stationary platens being connected with each other by tie rods,
   the clamping device further comprising a pressurizing mechanism,
   the pressurizing mechanism including:
   a pressure plate arranged between the stationary platen and the stationary metallic mold, the stationary metallic mold being attached to the pressure plate;
   a piston slidably arranged in a cylinder provided in the stationary platen, the piston being capable of protruding toward the pressure plate;
   a bladder arranged between the piston and the cylinder in the stationary platen, the bladder being capable of clamping the movable and the stationary metallic molds via the piston when the bladder is expanded and contracted by supplying and discharging hydraulic pressure; and
   a soft protective member interposed between the piston and the bladder and capable of closing a gap between them when the bladder is expanded.

2. A clamping device according to claim 1, wherein the soft protective member is arranged in a recessed space formed on an outer circumference of the piston close to an edge portion, and the soft protective member is a soft piston ring made of fibers, the cross section of which is square, the soft piston ring having hard core portions at the corners on the cross section.

3. A clamping device according to claim 1, wherein the soft protective member is composed in such a manner that a hard backup ring and a soft piston ring, which is arranged adjacent to the bladder, are put on each other.

4. A clamping device according to claim 1, wherein the cylinder is composed of a cylinder block integrated with the stationary platen into one body.

5. A clamping device according to claim 1, wherein the bladder houses an insert die, the shape of which is identical with an internal shape of the bladder, an opening edge portion of the bladder is pressed and fixed between the insert die and the cylinder, and hydraulic oil can be supplied into the bladder via a hydraulic oil path formed in the insert die.

6. A clamping device according to claim 5, wherein a protrusion is provided in the bladder, an engaging groove to be engaged with the protrusion is provided in the insert die so that the insert die can be fixed to the bladder and prevented from being disconnected from the bladder.

7. A clamping device according to claim 5, wherein a cutout step portion is formed at a circumferential edge of an opposing portion, which is opposed to the bladder, of the piston to push the bladder, and a soft protective member is attached to this cutout step portion so that the soft protective member is opposed to the circumferential edge portion of the bladder.

8. A clamping device according to claim 5, wherein a hydraulic oil leakage detecting means is provided on a sliding face of the piston in the cylinder so that damage to the bladder can be detected.

9. A clamping device according to claim 5, further comprising a mold releasing cylinder mechanism in which a ball screw member of an electrically driven ball screw mechanism, which is the opening and closing operation mechanism, is supported so that the ball screw member can be moved in the axial direction and a force in the axial direction is given to the ball screw member so as to generate a mold releasing force, and the ball screw member is provided with a brake means for restricting rotation in the case of releasing the mold.

10. A clamping device according to claim 9, wherein hydraulic oil in a clamping hydraulic circuit, which is connected with a hydraulic oil supply source to the bladder, is capable of being supplied to the mold releasing cylinder mechanism.

11. A clamping device according to claim 9, wherein a hydraulic pressure containing means for containing hydraulic pressure at the origin restoration position of the ball screw member is arranged in the hydraulic path to the mold releasing cylinder mechanism so that a movement in the axial direction can be restricted.

12. A clamping device according to claim 10, wherein the hydraulic pressure supply source is a piston pump driven by a servo motor.

13. A clamping device according to claim 5, further comprising: a platen lock means for fixing the movable platen to the tie rod at the metallic mold closing position with respect to the stationary platen; and a wall thickness changing plate means arranged between the platen lock means and the movable platen.

14. A clamping device according to claim 5, further comprising: a platen lock means for fixing the movable platen to the tie rod at the metallic mold closing position with respect to the stationary platen; and a wedge mechanism for adjusting a position of the platen lock means in the axial direction of the tie rod by a wedge action.

15. A clamping device according to claim 14, wherein the wedge mechanism is composed of a stationary wedge and a movable wedge which are interposed between the platen lock means and the platen and joined to each other on an oblique face, and the wedge mechanism is provided with a movable wedge insertion depth adjusting mechanism for adjusting the wedge thickness.

16. A clamping device according to claim 5, wherein the pressurizing mechanism includes a motor, which is capable of reversing and controlling torque and speed, and a piston pump driven by the motor,
an opening and closing control valve for containing pressure is arranged in a hydraulic oil supply path communicating from a discharge port of the piston pump to a hydraulic chamber of the pressurizing mechanism,
the clamping device further comprising a control means for opening an opening and closing control valve for containing pressure according to a clamping start signal, control means for normally rotating the piston pump, control means for closing the opening and closing control valve for containing pressure when the pressurizing mechanism has reached a setting clamping pressure, and control means for returning hydraulic oil in the upstream of the opening and closing control valve to a tank via the piston pump by reversing the motor.

17. A clamping device according to claim 16, wherein the piston pump is a variable discharge piston pump capable of automatically reducing a quantity of discharge when an angle of the swash plate is changed according to an increase in the pressure on the discharge port side.

18. A clamping device according to claim 16, wherein the pressurizing mechanism is provided with a bladder capable of expanding and contracting by supplying hydraulic oil into the bladder so that the pressure plate can be pushed out, a returning oil path to a tank is arranged on the discharge port side of the opening and closing control valve for containing pressure, and an opening and closing control valve for releasing clamping pressure and a relief valve, which is connected in parallel with the opening and closing control valve for releasing clamping pressure, for releasing pressure in the case of an abnormal pressure increase in the bladder are arranged in the returning oil path.

19. A clamping device according to claim 16, wherein the pressurizing mechanism is composed of the bladder, which is expanded and contracted when hydraulic oil is charged into the bladder, so as to push out the pressure plate, a return hydraulic oil path to the tank is provided on the discharge port side of the opening and closing control valve for containing pressure, the return hydraulic oil path includes a by-pass hydraulic oil path connected with the return hydraulic oil path on the entrance side of the opening and closing control valve for containing pressure, and the by-pass hydraulic oil path includes a by-pass control valve for by-passing pump pressure to the tank when it is detected that the pressure plate is excessively moved.

20. A mold releasing method of a clamping device comprising the steps of: opening and closing metallic molds by an opening and closing mechanism for opening and closing a stationary platen and a movable platen, which are connected with each other by tie rods, to which metallic molds are attached; and clamping the molds by pushing a piston when hydraulic pressure is introduced into a bladder built in a pressurizing mechanism, which can be expanded and contracted, arranged in at least one of the platens wherein a ball screw member of the opening and closing operation mechanism is being movably supported by the platen so that it can be moved in the axial direction, rotation of the ball screw member is restricted, and a mold releasing force is generated by moving the ball screw member in the axial direction by hydraulic pressure.

21. A mold releasing method of a clamping device according to claim 20, wherein when the mold releasing is started, a brake means for restricting rotation of the ball screw member is operated, hydraulic oil is supplied from the clamping hydraulic pressure source to the mold releasing cylinder mechanism to move the ball screw member in the axial direction, and the brake means is released so as to open the molds by the electrically driven operation.

22. A mold releasing method of a clamping device according to claim 21, wherein after the completion of opening the molds, the mold releasing cylinder mechanism is returned to the origin position so as to contain hydraulic oil in the mold releasing cylinder mechanism so that the mold releasing cylinder mechanism can be prevented from moving.

23. A control method of increasing and decreasing hydraulic pressure for clamping in which metallic molds are closed by a stationary platen and a movable platen, which are connected with each other by tie rods, to which the metallic molds are respectively attached, and hydraulic pressure is introduced into a pressurizing mechanism capable of pushing out a pressure plate attached to the platen body, the pressure plate being capable of coming into contact with and separating from the platen body, wherein
after hydraulic pressure has been increased to a clamping pressure when the rotation of a piston pump is controlled in the case of increasing hydraulic pressure so as to supply hydraulic oil to the pressurizing mechanism, the hydraulic pressure is contained on the pressurizing mechanism side, after that, hydraulic pressure in a hydraulic oil path on the upstream side of the pressure containing position is smoothly decreased by controlling a reverse speed of the piston pump, after the hydraulic pressure has been sufficiently decreased, the piston pump is stopped, after hydraulic pressure has been increased to a clamping pressure when the rotation of a piston pump is controlled in the case of decreasing hydraulic pressure so as to supply hydraulic oil to the pressurizing mechanism, the hydraulic pressure is contained on the pressurizing mechanism side, and the piston pump is operated and hydraulic pressure in a hydraulic oil path on the upstream side of the hydraulic pressure containing position is increased so that the hydraulic pressure before the pressure containing position and the hydraulic pressure after the pressure containing position can be equivalent to each other, after the pressure containing has been released, hydraulic pressure in a hydraulic oil path on the upstream side of the pressure containing position is smoothly decreased by controlling a reverse speed of the piston pump, and hydraulic pressure is released to the tank side via the piston pump.

* * * * *